US012114131B2

(12) United States Patent
Recker

(10) Patent No.: US 12,114,131 B2
(45) Date of Patent: Oct. 8, 2024

(54) EAR-WORN ELECTRONIC SYSTEM EMPLOYING IN-EAR DEVICE AND BATTERY CHARGING USING AT-EAR DEVICE BATTERY CHARGER

(71) Applicant: STARKEY LABORATORIES, INC., Eden Prairie, MN (US)

(72) Inventor: Karrie LaRae Recker, Edina, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 133 days.

(21) Appl. No.: 17/770,957

(22) PCT Filed: Sep. 30, 2020

(86) PCT No.: PCT/US2020/053613
§ 371 (c)(1),
(2) Date: Apr. 21, 2022

(87) PCT Pub. No.: WO2021/086537
PCT Pub. Date: May 6, 2021

(65) Prior Publication Data

US 2022/0394371 A1 Dec. 8, 2022

Related U.S. Application Data

(60) Provisional application No. 62/928,652, filed on Oct. 31, 2019, provisional application No. 62/950,864, filed on Dec. 19, 2019.

(51) Int. Cl.
*H04R 25/00* (2006.01)
*H04R 1/10* (2006.01)

(52) U.S. Cl.
CPC ........... *H04R 25/43* (2013.01); *H04R 1/1016* (2013.01); *H04R 1/1025* (2013.01);
(Continued)

(58) Field of Classification Search
CPC .... H04R 25/43; H04R 25/453; H04R 25/505; H04R 1/1016; H04R 1/1025; H04R 2225/025; H04R 2225/31
See application file for complete search history.

(56) References Cited

U.S. PATENT DOCUMENTS 5,606,621 A 2/1997 Reiter et al.
6,253,871 B1 7/2001 Aceti
(Continued)

FOREIGN PATENT DOCUMENTS

EP 2663095 11/2013
EP 3273703 1/2018
(Continued)

OTHER PUBLICATIONS

PCT Search Report and Written Opinion for PCT/US2020/053613 dated Dec. 10, 2020 (17 pages).
(Continued)

*Primary Examiner* — Suhan Ni
(74) *Attorney, Agent, or Firm* — Mueting Raasch Group

(57) ABSTRACT

An ear-worn electronic system comprises an inner device and an outer device configured for deployment at one ear of a wearer. The inner device comprises a first housing configured for placement at least partially within an ear canal of the wearer, a first rechargeable battery and first charging circuitry disposed in the first housing, and first electronic circuitry disposed in the first housing and coupled to the first rechargeable battery. The outer device comprises a second housing separate from the first housing and configured for placement at the wearer's ear proximal of the first housing in an outer ear direction, and a second rechargeable battery and second charging circuitry disposed in the second housing. The second charging circuitry is configured to cooperate with the first charging circuitry to charge the first recharge-
(Continued)

able battery via a charging link between the first and second charging circuitry.

9 Claims, 11 Drawing Sheets

(52) U.S. Cl.
CPC ......... *H04R 25/453* (2013.01); *H04R 25/505* (2013.01); *H04R 2225/025* (2013.01); *H04R 2225/31* (2013.01)

(56) References Cited

U.S. PATENT DOCUMENTS

| | | | | |
|---|---|---|---|---|
| 6,643,378 | B2 | 11/2003 | Schumaier | |
| 8,031,900 | B2 * | 10/2011 | Dyer | H04R 1/1016 381/328 |
| 8,116,494 | B2 | 2/2012 | Rass | |
| 8,588,448 | B1 | 11/2013 | Rickards et al. | |
| 8,842,863 | B2 | 9/2014 | Nielsen et al. | |
| 9,426,587 | B2 | 8/2016 | Stoffels et al. | |
| 10,575,106 | B1 * | 2/2020 | Bergmann | H04R 25/505 |
| 2002/0076071 | A1 * | 6/2002 | Single | H04R 25/606 381/323 |
| 2002/0076073 | A1 | 6/2002 | Taenzer et al. | |
| 2003/0092975 | A1 | 5/2003 | Casscells, III et al. | |
| 2007/0274553 | A1 | 11/2007 | Rass | |
| 2008/0146890 | A1 | 6/2008 | LeBoeuf | |
| 2009/0262964 | A1 | 10/2009 | Havenith et al. | |
| 2010/0128906 | A1 | 5/2010 | Haenggi et al. | |
| 2011/0243357 | A1 | 10/2011 | Probst et al. | |
| 2011/0286616 | A1 | 11/2011 | Beck et al. | |
| 2014/0185845 | A1 | 7/2014 | Udesen | |
| 2015/0092969 | A1 | 4/2015 | Meskens et al. | |
| 2017/0238812 | A1 | 8/2017 | Atlas | |

FOREIGN PATENT DOCUMENTS

| | | |
|---|---|---|
| WO | 2006/094843 | 9/2006 |
| WO | 2011/159349 | 12/2011 |
| WO | 2013/188902 | 12/2013 |

OTHER PUBLICATIONS

PCT Search Report and Written Opinion for PCT/US2020/053616 dated Dec. 10, 2020 (14 pages).
Notice of Abandonment for U.S. Appl. No. 13/113,273 dated Aug. 21, 2013, Inventor: Frank Beck (14 pages).
Non Final Office Action for U.S. Appl. No. 15/654,193 dated Jul. 13, 2018, Inventor: Brian Dobson (11 pages).
Final Office Action issued for U.S. Appl. No. 15/564,193 dated Mar. 13, 2020, Inventor: Brian Dobson (10 pages).
Aazami, "Wireless Power for a Hearing Device" GB-2569536 -A. Jun. 26, 2101 (Year: 2019).
Sprague, "Hearing Assistance Systems Configured To Detect And Provide Protection To The User Harmful Conditions", WO-20161677877-A1, Oct. 20, 2016 (Year 2016).
U.S. Appl. No. 17/771,343; Office Action issued Feb. 1, 2024; 23 pages.

* cited by examiner

EAR-WORN ELECTRONIC SYSTEM EMPLOYING IN-EAR DEVICE AND BATTERY CHARGING USING AT-EAR DEVICE BATTERY CHARGER

RELATED PATENT APPLICATIONS

This application is a U.S. National Stage application under 35 U.S.C. 371 of PCT Application No. PCT/US2020/053613 filed Sep. 30, 2020, which claims priority to U.S. Provisional Application No. 62/928,652 filed Oct. 31, 2019 and U.S. Provisional Application No. 62/950,864 filed Dec. 19, 2019, the contents of which are hereby incorporated by reference in their entireties.

TECHNICAL FIELD

This application relates generally to charging of rechargeable ear-level electronic devices, including hearing aids, personal amplification devices, hearables, and physiologic and/or position/motion sensing devices.

BACKGROUND

Hearing devices provide sound for the user. Some examples of hearing devices are headsets, hearing aids, speakers, cochlear implants, bone conduction devices, and personal listening devices. Hearing devices often include a rechargeable battery that can be recharged, but can become depleted during daily use, leaving the user without the benefit of a functioning hearing device.

SUMMARY

Embodiments are directed to an ear-worn electronic system comprising a plurality of discrete devices configured for deployment at one ear of a wearer. The system comprises an inner device and an outer device. The inner device comprises a first housing configured for placement at least partially within an ear canal of the wearer, a first rechargeable battery and first charging circuitry disposed in the first housing, and first electronic circuitry disposed in the first housing and coupled to the first rechargeable battery. The outer device comprises a second housing separate from the first housing and configured for placement at the wearer's ear proximal of the first housing in an outer ear direction, and a second rechargeable battery and second charging circuitry disposed in the second housing. The second charging circuitry is configured to cooperate with the first charging circuitry to charge the first rechargeable battery via a charging link between the first and second charging circuitry.

Embodiments are directed to an ear-worn electronic system comprising a plurality of discrete devices configured for deployment at one ear of a wearer. The system comprises an inner device and an outer device. The inner device comprises a first housing configured for placement at least partially within an ear canal of the wearer, a first rechargeable battery and first charging circuitry disposed in the first housing, and first electronic circuitry disposed in the first housing and coupled to the first rechargeable battery. The outer device comprises a second housing separate from the first housing and configured for placement at the wearer's ear proximal of the first housing in an outer ear direction, and a second rechargeable battery and second charging circuitry disposed in the second housing. The second charging circuitry is configured to cooperate with the first charging circuitry to recharge the first rechargeable battery via a charging link between the first and second charging circuitry. The outer device also comprises second electronic circuitry disposed in the second housing and coupled to the second rechargeable battery. The second electronic circuitry is configured to communicate with the first electronic circuitry. A charging unit comprises at least a first charge port configured to receive the outer device and third charging circuitry coupled to the first charge port. The third charging circuitry is configured to cooperate with the second charging circuitry to recharge the second rechargeable battery via the first charge port. The charging unit comprises a processor coupled to memory. The processor is configured to receive data from the second electronic circuitry via the first charge port. The data can comprise data generated or acquired by one or both of the inner device and the outer device.

Embodiments are directed to a method implemented using an ear-worn electronic system comprising an inner device and a separable outer device configured for deployment at one ear of a wearer. The method comprises receiving, by a connection port of the inner device, an electrical connector disposed at a distal end of a wired charging link extending from the outer device. The inner device comprises a first housing configured for placement at least partially within an ear canal of the wearer, a first rechargeable battery and first charging circuitry disposed in the first housing, and first electronic circuitry disposed in the first housing and coupled to the first rechargeable battery. The outer device comprises a second housing separate from the first housing and configured for placement at the wearer's ear proximal of the first housing in an outer ear direction, and a second rechargeable battery and second charging circuitry disposed in the second housing. The method also comprises charging the first rechargeable battery using the second rechargeable battery via the charging link coupling the first charging circuitry and the second charging circuitry.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
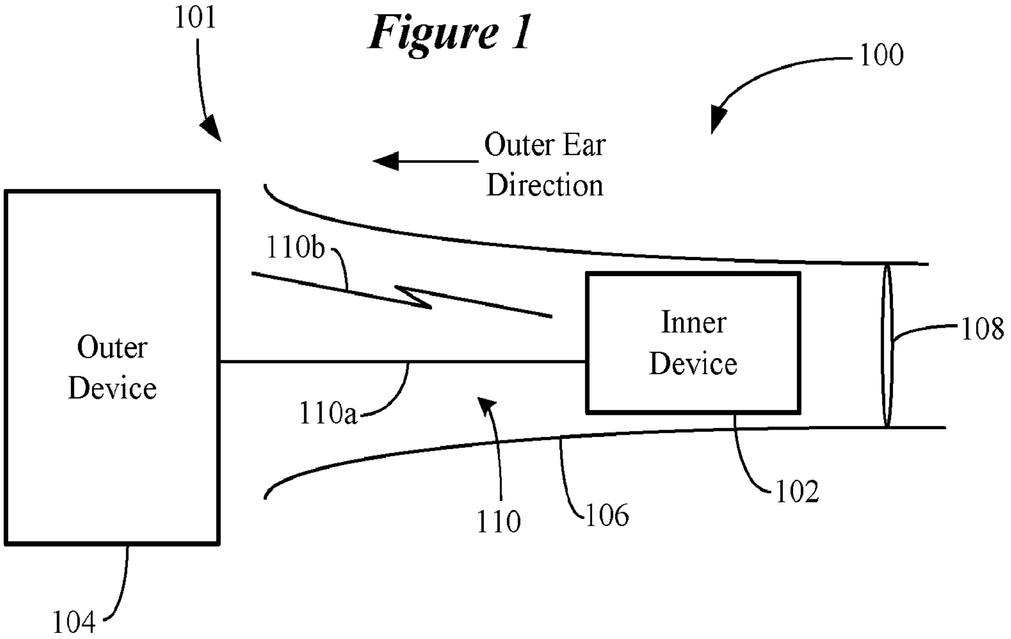
FIG. 1 illustrates an ear-worn electronic system shown in a deployed configuration at a wearer's ear in accordance with any of the embodiments disclosed herein.

Embodiments of the disclosure are directed to an ear-worn electronic system comprising an in-ear electronic device, referred to herein as the inner device, and an at- or on-ear electronic device, referred to herein as the outer device. For convenience, the term in-ear electronic device is interchangeable with the term inner device or first device, and the at- or on-electronic device is interchangeable with the term outer device or second device. A first or inner device refers to the device positioned closest to the wearer's ear drum, and the second or outer device refers to the device positioned furthest away from the wearer's ear drum when the ear-worn electronic system is used by a wearer. As such, the second or outer device is located proximal of the first or outer device in an outer ear direction (away from the ear drum) during use.

The inner device can be configured for deployment at least partially or entirely within the wearer's ear canal. The outer device can be configured for deployment entirely externally of the ear (e.g., beyond the outer ear such as behind the ear) or at least partially externally of the ear. The outer device can be configured for deployment at least partially within the outer ear, such as from the helix to the ear canal (e.g., the concha cymba, concha cavum) and can extend up to or into the ear canal.

An ear-worn electronic system is configured for use with one ear of a wearer, such as the left ear or the right ear. In a representative implementation, an ear-worn electronic system comprising an inner device and an outer device can be configured for deployment in/at a wearer's left ear or the wearer's right ear. Two ear-worn electronic systems can be configured for use with both ears of a wearer, such that a first ear-worn electronic system is configured for use with one of the wearer's two ears and a second ear-worn electronic system is configured for use with the other of the wearer's two ears. In another representative implementation, a first ear-worn electronic system comprising a first inner device and a first outer device can be configured for deployment in/at a wearer's left ear. A second ear-worn electronic system comprising a second inner device and a second outer device can be configured for deployment in/at a wearer's right ear.

According to any of the embodiments disclosed herein, the inner device of an ear-worn electronic system can be configured for prolonged deployment in a wearer's ear. For example, the inner device can be configured for continuous or nearly-continuous deployment in a wearer's ear (e.g., round-the-clock or substantially round-the-clock deployment within the wearer's ear). According to any of the embodiments disclosed herein, the inner device of an ear-worn electronic system can be configured for deployment in a wearer's ear during a span of time that includes the wearer's sleep. According to any of the embodiments disclosed herein, the inner device of an ear-worn electronic system can be configured for deployment in a wearer's ear during a span of time which includes both wakefulness of the wearer and the wearer's sleep (e.g., the entire duration of the wearer's sleep and some, most or all of the duration of wearer wakefulness).

In the context of any of the inner device deployment scenarios described herein, the outer device is configured to be deployed at, in or on the wearer's ear at a location proximal of the inner device in an outer ear direction. The outer device is configured for intermittent deployment at the wearer's ear relative to continuous or nearly-continuous deployment of the inner device in the wearer's ear. In accordance with any of the embodiments disclosed herein, the outer device can be configured for deployment at the wearer's ear during wakefulness of the wearer. For example, the outer device of an ear-worn electronic system can be configured to be deployed at the wearer's ear during wakefulness of the wearer, and inner device of the system can be configured to be deployed in the wearer's ear during both wakefulness of the wearer and the wearer's sleep.

An ear-worn electronic system of the present disclosure refers to a wide variety of ear-level electronic devices comprising an inner device and an outer device. Inner devices include, but are not limited to, in-the-canal (ITC), completely-in-the-canal (CIC), and invisible-in-canal (IIC) type devices. Outer devices include, but are not limited to, behind-the-ear (BTE), receiver-in-canal (MC), and in-the-ear (ITE) type devices. The inner and outer devices can be implemented as any combination of the above-listed devices. For example, the inner and outer devices, when detachably coupled to one another, can have a configuration similar to that of a receiver-in-canal (MC) or receiver-in-the-ear (RITE) type device, with the inner device comprising components in addition to a receiver or speaker. By way of further example, a representative outer device can be configured as a BTE device, in part, and ITE device, in part. A representative inner device can be configured as a CIC device, in part, and in ITE type device, in part. The outer device can be implemented as another type of hearable, such as a wearable earphones, headphone, or earbud.

In accordance with any of the embodiments disclosed herein, the ear-worn electronic system can be implemented as a hearing assistance system. The term hearing assistance system of the present disclosure refers to a wide variety of ear-level electronic devices that can aid a person with impaired hearing. The term hearing assistance system also refers to a wide variety of ear-level electronic devices that can produce optimized or processed sound for persons with normal hearing. A hearing assistance system of the present disclosure can be implemented as a hearing aid system, in which one or both of the inner and outer devices are configured to operate as a hearing aid. For example, one of the inner and outer devices can be configured to operate as a hearing aid, and the other of the inner and outer devices can be configured to operate as a different device (e.g., a battery charger, a positional sensor and/or a motion sensor, a physiologic sensor). By way of further example, each of the inner and outer devices can be configured to operate as a hearing aid with the same or different components and/or level of functionality.

A hearing assistance system comprising inner and outer devices can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. A hearing assistance system comprising inner and outer devices can be configured to effect bi-directional communication (e.g., wireless communication) of data with an external source, such as a remote server via the Internet or other communication infrastructure.

In accordance with any of the embodiments disclosed herein, an ear-worn electronic system can be implemented as a health, medical, and/or lifestyle monitoring system, exclusive of or in addition to a hearing assistance system capability. One or both of the inner and outer devices can include one or more sensors. For example, one or both of the inner and outer devices can include one or more physiologic sensors including, but not limited to, an EKG or ECG sensor, a pulse oximeter, a respiration sensor, a temperature sensor, a glucose sensor, an EEG sensor, an EMG sensor, an EOG sensor, or a galvanic skin response sensor.

An ear-worn electronic system (e.g., one or both of the inner and outer devices) in accordance with any of the embodiments disclosed herein can include one or more positional and/or motion sensors, such as one or more of accelerometers, gyros, magnetometers, and geo-location sensors. For example, a positional sensor and/or a motion sensor of an ear-worn electronic system can be implemented to include one or more of a multi-axis (e.g., 9-axis) sensor, an IMU (inertial measurement unit), and an onboard GPS or an external GPS (e.g., a GPS of a smartphone communicatively linked to the ear-worn electronic system via a BLE link). A suitable IMU is disclosed in commonly owned U.S. Pat. No. 9,848,273, which is incorporated herein by reference. Typically, the outer device is configured to include a geo-location sensor due to size limitations of the inner device. For purposes of convenience, and not of limitation, the term positional sensor is used herein to refer to a positional sensor, a motion sensor, or a combination of positional and motion sensors.

According to any of the embodiments disclosed herein, the inner device of an ear-worn electronic system can be configured to be worn by the wearer while the wearer is sleeping. The inner device can include one or more sensors configured to provide the wearer and/or the wearer's caregiver/clinician with information about the wearer's sleep patterns, cardiac, pulmonary, and/or brain activity during sleep, potential sleep-related health issues (e.g., sleep disordered breathing, such as central or obstructive sleep apnea), and other physiologic and lifestyle information. The inner device can be configured as both a sleep monitoring device operative during wearer sleep and a hearing device during wakefulness of the wearer. In applications where the inner device is deployed for a prolonged period (e.g., during periods of both sleep and wakefulness; round- or nearly round-the clock deployment), charging the rechargeable power source of the inner device becomes problematic. For example, in applications where the inner device is configured for operation during wearer sleep and wakefulness of the wearer, there would not be a good time to charge the rechargeable power source of the inner device without disrupting sleep or daytime operation of the inner device.

According to any of the embodiments disclosed herein, each of the inner and outer devices includes a rechargeable power source, such as a lithium-ion or other rechargeable battery. In some embodiments, the rechargeable power source of one or both of the inner and outer devices can include a supercapacitor, exclusive of or in addition to a rechargeable battery. In some configurations, the inner device comprises one or more sensors (e.g., physiologic and/or positional sensors), in addition to components of a typical hearing assistance device (e.g., hearing aid), including a microphone, a receiver or speaker, an audio signal processing unit, and memory. In other configurations, the inner device comprises one or more sensors (e.g., physiologic and/or positional sensors) and is devoid of an audio processing facility. In further configurations, the inner device comprises at least a microphone(s), a receiver/speaker, and audio processing circuitry which can be useful for environmental awareness, alerting the wearer to dangers and alarms, using the inner device(s) as a tinnitus masker, and to provide hearing aid-type functionality in the morning when the wearer first gets up, but before he or she has connected the outer device(s) to the inner device(s).

The outer device, according to some embodiments, comprises components that cooperate to charge the rechargeable power source of the inner device, including a rechargeable power source, charging circuitry, and circuitry for establishing a charging link with charging circuitry of the inner device. In addition to these charging components, the outer device can also include components of a typical hearing assistance device (e.g., hearing aid), such as those listed above. The outer device can comprise one or more sensors (e.g., physiologic and/or positional sensors), in addition to or to the exclusion of components of a typical hearing assistance device (e.g., hearing aid).

In accordance with a representative use scenario, the inner device is deployed at least partially within the wearer's ear canal for continuous or near-continuous operation, and the outer device is deployed proximal of the inner device in an outer ear direction (e.g., behind the ear) only during a period of wakefulness of the wearer. In this wakefulness configuration, the inner device is coupled to the outer device via a charging link, which may be a wired or wireless link. During the period of wakefulness, the outer device charges the rechargeable power source of the inner device via the charging link, allowing the inner device to operate throughout the wakefulness period.

Having charged the rechargeable power source of the inner device during the wakefulness period, the inner device is ready for operation during the wearer's sleep independent of the outer device. Before going to sleep or after the inner device is sufficiently charged, the wearer can remove the outer device from his or her ear, which severs or terminates the charging link between the outer and inner devices. The rechargeable power source of the outer device is recharged during the wearer's sleep via a charging device. The inner device is operative during the period of the wearer's sleep. After waking from the night's sleep, the wearer redeploys the outer device at his or her ear which reestablishes the charging link between the inner and outer devices. The charging process of inner device is repeated for another day of operation.

In accordance with another representative use scenario, the outer device (which is charged while the wearer is sleeping) can be configured as a RIC type hearing device (e.g., hearing aid) or a thin-tube BTE type hearing device (e.g., hearing aid), and the inner device can be configured as a CIC type hearing device (e.g., hearing aid). A variety of useful functionalities can be implemented with an ear-worn electronic system comprising inner and outer device each of which is implemented as a hearing device (e.g., hearing aid). For example, the inner and outer devices can perform different functions depending on whether they are connected to each other (e.g., in "awake mode") or not (e.g., in "sleep mode"), examples of which are provided herein.

Continuing with this representative use scenario, when the BTE device of the ear-worn electronic system is connected or coupled to the CIC device, the battery of the BTE device charges the battery of the CIC device. Minimally, the BTE device can be worn until the CIC device is fully charged. However, if the BTE device includes some, or all, of the components typically included in a hearing aid for example, then additional functionality can be provided to the wearer, and he or she may wish to wear the BTE device during all waking hours.

In a "charging" mode, such as during the wearer's sleep, minimally the battery of the BTE device is charged. While charging, for example, the BTE device can be configured to sync data that has been stored in or acquired by the BTE device throughout the day with one or more other devices, such as one or more computers, smartphones or cloud-based storage systems. In this scenario, some of the data that the BTE device transfers may have been received from the CIC device when the two components were last connected. For example, a charging unit (desktop or portable) can be used to charge the BTE device when disconnected from the CIC device. The charging unit can include a processor and an input/output interface for receiving data stored in the BTE device, which may include CIC device data in addition to BTE device data. The processor of the charging unit can be configured to analyze at least some of the data that it receives, or it may serve as a relay between the BTE/CIC devices and one or more other computers/cloud-based storage systems. After the data is stored and analyzed, the results may be shared with the hearing device manufacturer and/or the hearing device wearer (e.g., via an app or a website).

The transfer of data from the BTE device to another device for analysis and storage can occur automatically whenever the BTE device is resting in or coupled to the charging unit. Further, while the BTE device is connected to the charging unit, the charging unit can push information to the BTE device, which in turn, can push information to the CIC device once they are reconnected. This information can include firmware updates or parameter changes, some of which may be recommendations based on an analysis of the wearer's data that were previously offloaded. Other parameter changes may be based on an analysis of data from a larger group of hearing device wearers.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-worn electronic system comprising a plurality of discrete devices configured for deployment at one ear of a wearer includes an inner device comprising a first housing configured for placement at least partially within an ear canal of the wearer, a first rechargeable battery and first charging circuitry disposed in the first housing, and first electronic circuitry disposed in the first housing and coupled to the first rechargeable battery. An outer device of the system comprises a second housing separate from the first housing and configured for placement at the wearer's ear proximal of the first housing in an outer ear direction, and a second rechargeable battery and second charging circuitry disposed in the second housing, the second charging circuitry configured to cooperate with the first charging circuitry to charge the first rechargeable battery via a charging link between the first and second charging circuitry.

Example Ex2. The system according to Ex1, wherein the inner device is configured for continuous use within the wearer's ear for a duration longer than a duration of inner device operation using a single charge of the first rechargeable battery, and the outer device is configured to charge the first rechargeable battery to support continuous use of the inner device within the wearer's ear for a duration longer than the duration of inner device operation using the single charge of the first rechargeable battery.

Example Ex3. The system according to Ex1, wherein the inner device is configured to be worn by the wearer continuously during a period of time that includes wearer sleep and during all or a portion of wakefulness of the wearer, and the outer device is configured to be worn by the wearer only during wakefulness of the wearer.

Example Ex4. The system according to one or more of the preceding Examples, wherein the inner device is configured as a completely-in-the-canal (CIC) device, and the outer device is configured as a behind-the-ear (BTE) device or an in-the-ear (ITE) device.

Example Ex5. The system according to one or more of the preceding Examples, wherein one or both of the inner device and the outer device is configured as a hearing device.

Example Ex6. The system according to one or more of the preceding Examples, wherein the inner device is configured as a physiologic monitoring device comprising one or both of one or more physiologic sensors and one or more positional sensors.

Example Ex7. The system according to one or more of the preceding Examples, wherein the inner device is configured as a physiologic monitoring device and is devoid of an audio processing facility.

Example Ex8. The system according to one or more of the preceding Examples, wherein the charging link comprises a wired charging link or a wireless charging link.

Example Ex9. The system according to one or more of the preceding Examples, wherein at least one of the inner and outer devices is configured to generate a signal indicating a charge status of at least the first rechargeable battery.

Example Ex10. The system according to one or more of the preceding Examples, wherein the housing of the inner device comprises compliant material configured to enhance wearer comfort.

Example Ex11. A charging unit configured to receive at least the outer device of the ear-worn electronic system according to one or more of the preceding Examples, the charging unit comprising at least a first charge port configured to receive the outer device, third charging circuitry coupled to the first charge port, the third charging circuitry configured to cooperate with the second charging circuitry to charge the second rechargeable battery via the first charge port, and a processor coupled to memory, the processor configured to receive data from the second electronic circuitry via the first charge port, the data generated or acquired by one or both of the inner device and the outer device.

Example Ex12. The charging unit according to Ex11, wherein the data comprises first charge status data generated by the first charging circuitry and communicated by the inner device to the outer device.

Example Ex13. The charging unit according to Ex11 or Ex12, wherein the inner device is configured as one or both of a physiologic monitoring device and a positional monitoring device, and the data comprises one or both of physiologic monitoring data and positional data.

Example Ex14. The charging unit according to one or more according to Ex11 to Ex13, wherein the processor is configured to receive second data from the outer device via the first charge port, the second data generated by the outer device.

Example Ex15. A method implemented using an ear-worn electronic system comprising an inner device and a separable outer device configured for deployment at one ear of a wearer, the method comprising receiving, by a connection port of the inner device, an electrical connector disposed at a distal end of a wired charging link extending from the outer device. The inner device comprises a first housing configured for placement at least partially within an ear canal of the wearer, a first rechargeable battery and first charging circuitry disposed in the first housing, and first electronic circuitry disposed in the first housing and coupled to the first rechargeable battery. The outer device comprises a second housing separate from the first housing and configured for placement at the wearer's ear proximal of the first housing in an outer ear direction, and a second rechargeable battery and second charging circuitry disposed in the second housing. The method also comprises charging the first rechargeable battery using the second rechargeable battery via the charging link coupling the first charging circuitry and the second charging circuitry.

FIG. 1 illustrates an ear-worn electronic system 100 shown in a deployed configuration at a wearer's ear 101 in accordance with any of the embodiments disclosed herein. FIG. 1 illustrates the system 100 deployed in a connected configuration appropriate for use during wakefulness of the wearer. The system 100 includes an inner device 102 configured for placement at least partially within an ear canal 106 of the wearer's ear 101. In some configurations, the inner device 102 is configured for placement completely within the wearer's ear-canal 106. The system 100 also includes an outer device 104 configured for placement at the wearer's ear 101. In some configurations, the outer device 104 can be configured for placement entirely externally of the wearer's ear 101, such as behind the wearer's ear 101. In other configurations, the outer device 104 can be configured for placement at least partially externally of the ear. For example, the outer device 104 can be configured for deployment at least partially within the outer ear, such as from the helix to the ear canal (e.g., the concha cymba, concha cavum) and can extend up to or into the ear canal 106. As is shown in FIG. 1, the inner device 102 is positioned closest to the wearer's eardrum 108, and the outer device 104 is positioned furthest away from the eardrum 108 in the outer ear direction.

In the configuration shown in FIG. 1, the inner and outer devices 102, 104 are coupled together via a charging link 110. In some configurations, the inner and outer devices 102, 104 can be connected via a wired charging link 110*a*, such as an electrical conductor link. In other configurations, the inner and outer devices 102, 104 can be coupled via a wireless charging link 110*b*, such as an inductive link. The charging link 110 facilitates charging of a rechargeable power source disposed in the inner device 102 by a rechargeable power source disposed in the outer device 104 during a charging procedure.

Figure 2:
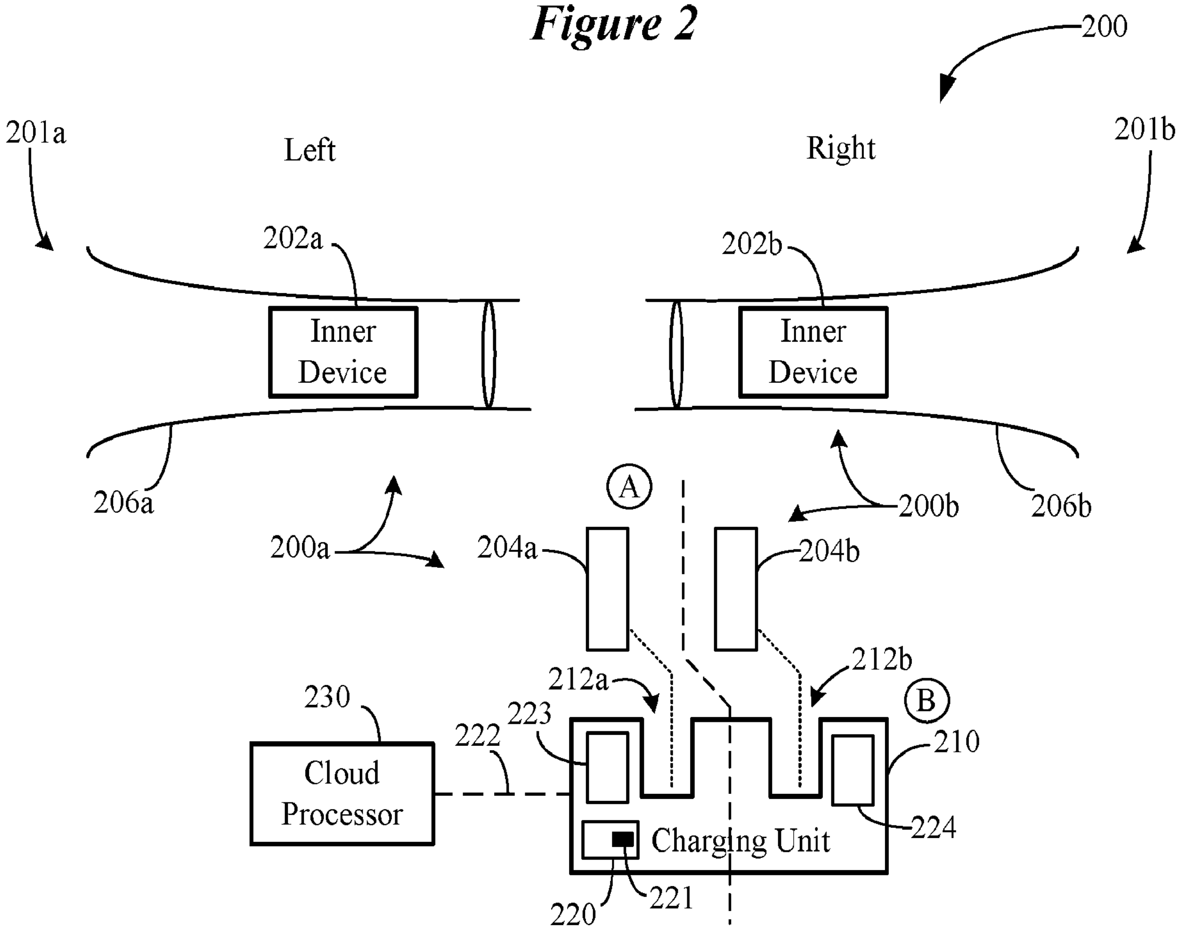
FIG. 2 illustrates an ear-worn electronic system arrangement comprising two ear-worn electronic systems in accordance with any of the embodiments disclosed herein.

FIG. 2 illustrates an ear-worn electronic system arrangement 200 comprising two ear-worn electronic systems 200*a* and 200*b* in accordance with any of the embodiments disclosed herein. System 200*a* comprises inner device 202*a* and outer device 204*a*. System 200*b* comprises inner device 202*b* and outer device 204*b*. In the representative embodiment shown in FIG. 2, system 200*a* is configured for use with the wearer's left ear 201*a* and system 200*b* is configured for use with the wearer's right ear 201*b*. FIG. 2 illustrates each system 200*a*, 200*b* deployed in a disconnected configuration in which each inner device 202*a*, 202*b* is disconnected or decoupled from its corresponding outer device 204*a*, 204*b*. In the disconnected configuration, each inner device 202*a*, 202*b* operates in an independent or standalone mode. For example, the disconnected configuration shown in FIG. 2 is appropriate for use during the wearer's sleep, during which the inner device 202*a*, 202*b* is operative. The disconnected configuration shown in FIG. 2 is also appropriate during wakefulness of the wearer, such as when the outer device 204*a*, 204*b* is not needed or desired.

The system 200 shown in FIG. 2 includes a charging unit 210 configured to charge a rechargeable power source of the outer devices 204*a*, 204*b*. The charging unit 210 includes a first charge port 212*a* configured to receive outer device 204*a* and a second charge port 212*b* configured to receive outer device 204*b*. The charging unit 210 includes charging circuitry 220 coupled to a power source, which may include a rechargeable power source. The charging circuitry 220 is configured to cooperate with charging circuitry of the outer devices 204*a*, 204*b* to charge rechargeable power sources of the outer devices 204*a*, 204*b*. The charging circuitry 220 can include a processor 221 coupled to memory. The processor 221 can be configured to receive data from the outer devices 204*a*, 204*b*. This data can include data acquired from or generated by the inner devices 202*a*, 202*b* and transferred to the outer devices 204*a*, 204*b* when in the connected configuration. This data can also include data acquired from or generated by the outer devices 204*a*, 204*b*. The data acquired from one or both of the inner devices 202*a*, 202*b* and the outer devices 204*a*, 204*b* can be analyzed by the processor 221 of the charging unit 210 and/or by a cloud processor 230 communicatively coupled to the processor via a wired link and/or wireless link 222.

The charging unit 210 can include a user interface 224 configured to visually and/or audibly communicate information to the wearer. The user interface 224 can include a display (e.g., LED, LCD, OLED, E-ink), one or more LEDs, and/or a speaker. The user interface 224 can include elements (e.g., LEDs) positioned at different locations of the charging unit 210 to communicate charge state and/or status of the outer devices 204*a*, 204*b*. For example, a number of LEDs can be controlled to communicate various types of information to the wearer. By way of example, a pulsing green on an LED near the first charge port 212*a* can indicate charging of outer device 204*a*. A pulsing green on an LED near the second charge port 212*b* can indicate charging of outer device 204*b*. A solid red on an LED near the first charge port 212*a* can indicate a charging error for outer device 204*a*. A solid red on an LED near the second charge port 212*b* can indicate a charging error for outer device 204*b*. In some embodiments, and as discussed below, the charging unit 210 can be configured to implement accelerated charging of the outer devices 204*a*, 204*b*. Accelerated charging of each of the outer devices 204*a*, 204*b* can be indicated by a flashing green LED, a green LED bouncing back and forth (knight rider, similar to a line marquee), or a fast pulsing green LED. A solid green LED near each of the first and second charge ports 212*a*, 212*b* can indicate that charging is complete.

In the embodiment shown in FIG. 2, the charging unit 210 is configured to charge rechargeable power sources of two outer devices 204*a*, 204*b* (shown as configuration B). In some embodiments, the system 200 shown in FIG. 2 includes a single ear-worn electronic system, such as system 200*a* (shown as configuration A). In such embodiments, the charging unit 210 need only include a single charge port, such as charge port 212*a*, for charging a single outer device, such as outer device 204*a*.

Figure 3:
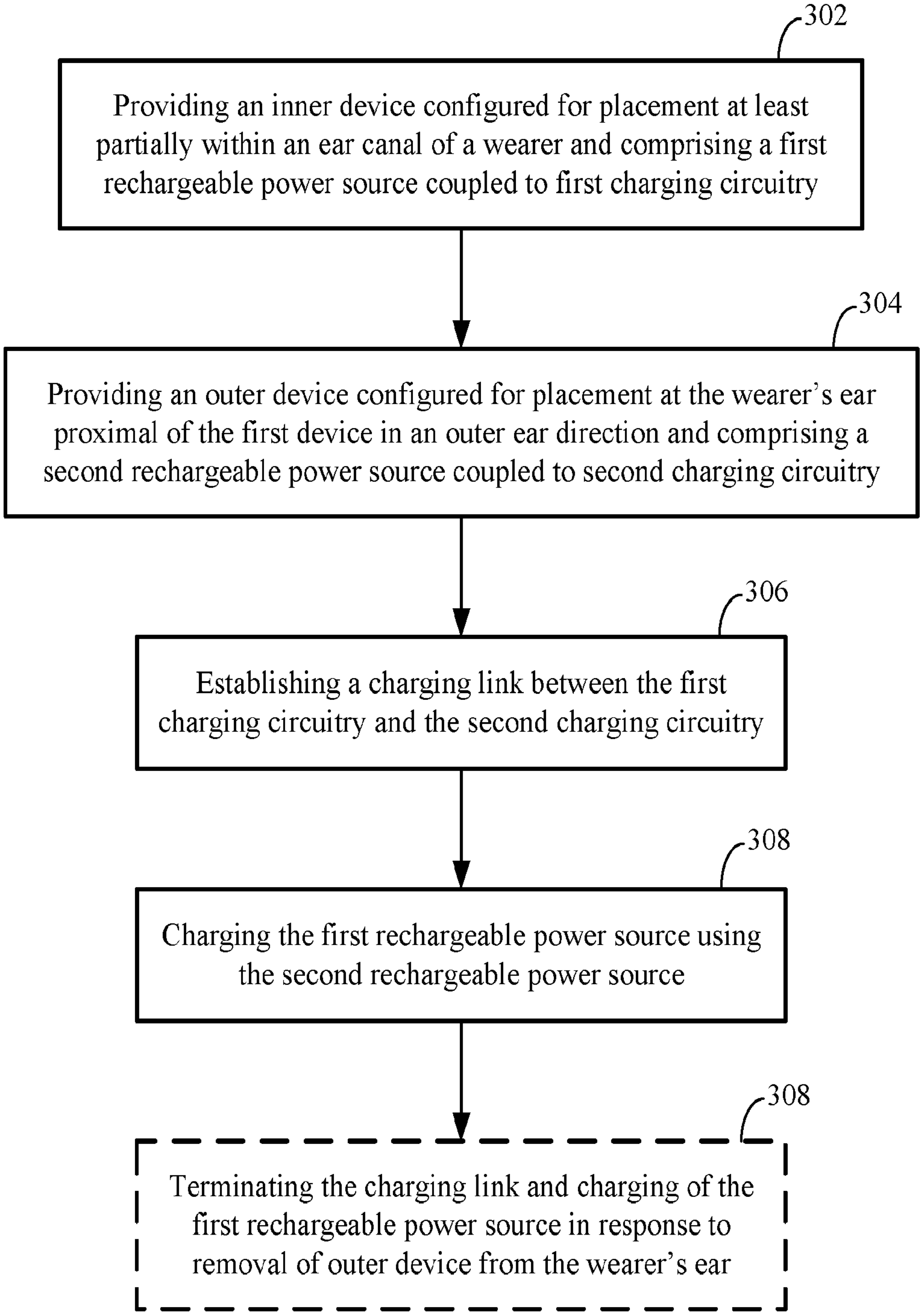
FIG. 3 illustrates a method of cooperative operation between an inner device and an outer device of an ear-worn electronic system in accordance with any of the embodiments disclosed herein.

FIG. 3 illustrates a method of cooperative operation between an inner device and an outer device of an ear-worn electronic system in accordance with any of the embodiments disclosed herein. The method shown in FIG. 3 involves providing 302 an inner device configured for placement at least partially within a near canal of a wearer. The inner device comprises a first rechargeable power source coupled to first charging circuitry. The method involves providing 304 an outer device configured for placement at the wearer's ear proximal of the first device in an outer ear direction. The outer device comprises a second rechargeable power source coupled to second charging circuitry. The method also involves establishing 306 a charging link between the first charging circuitry and the second charging circuitry. The method further involves charging 308 the first rechargeable power source using the second rechargeable power source. The method may also involve terminating 308 the charging link and charging of the first rechargeable power source in response to removal of the outer device from the wearer's ear.

Figure 4:
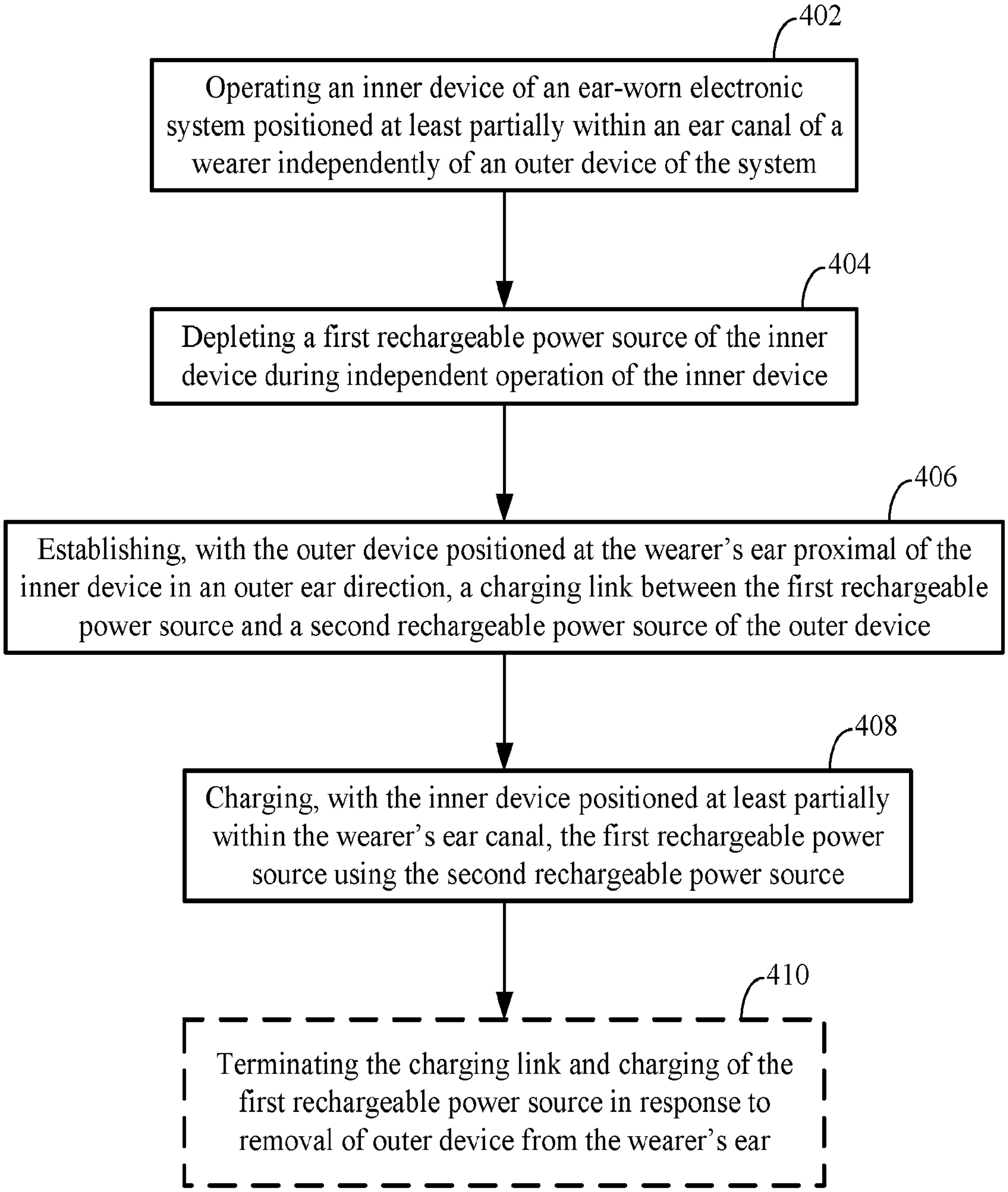
FIG. 4 illustrates a method of cooperative operation between an inner device and an outer device of an ear-worn electronic system in accordance with any of the embodiments disclosed herein.

FIG. 4 illustrates a method of cooperative operation between an inner device and an outer device of an ear-worn electronic system in accordance with any of the embodiments disclosed herein. The method shown in FIG. 4 involves operating 402 an inner device of the ear-worn electronic system positioned at least partially within an ear canal of the wearer independently of an outer device of the system. For example, the outer device may be removed from the wearer's ear and placed in a charging unit during the time in which the inner device is operative in the independent or standalone mode. The method involves depleting 404 a first rechargeable power source of the inner device during independent operation of the inner device. The method also involves establishing 406, with the outer device positioned at the wearer's ear proximal of the inner device in an outer ear direction, a charging link between the first rechargeable power source and a second rechargeable power source of the outer device. The method further involves charging 408, with the inner device positioned at least partially within the wearer's ear canal, the first rechargeable power source using the second rechargeable power source. The method may also involve terminating 410 the charging link and charging of the first rechargeable power source in response to removal of the outer device from the wearer's ear.

Figure 5:
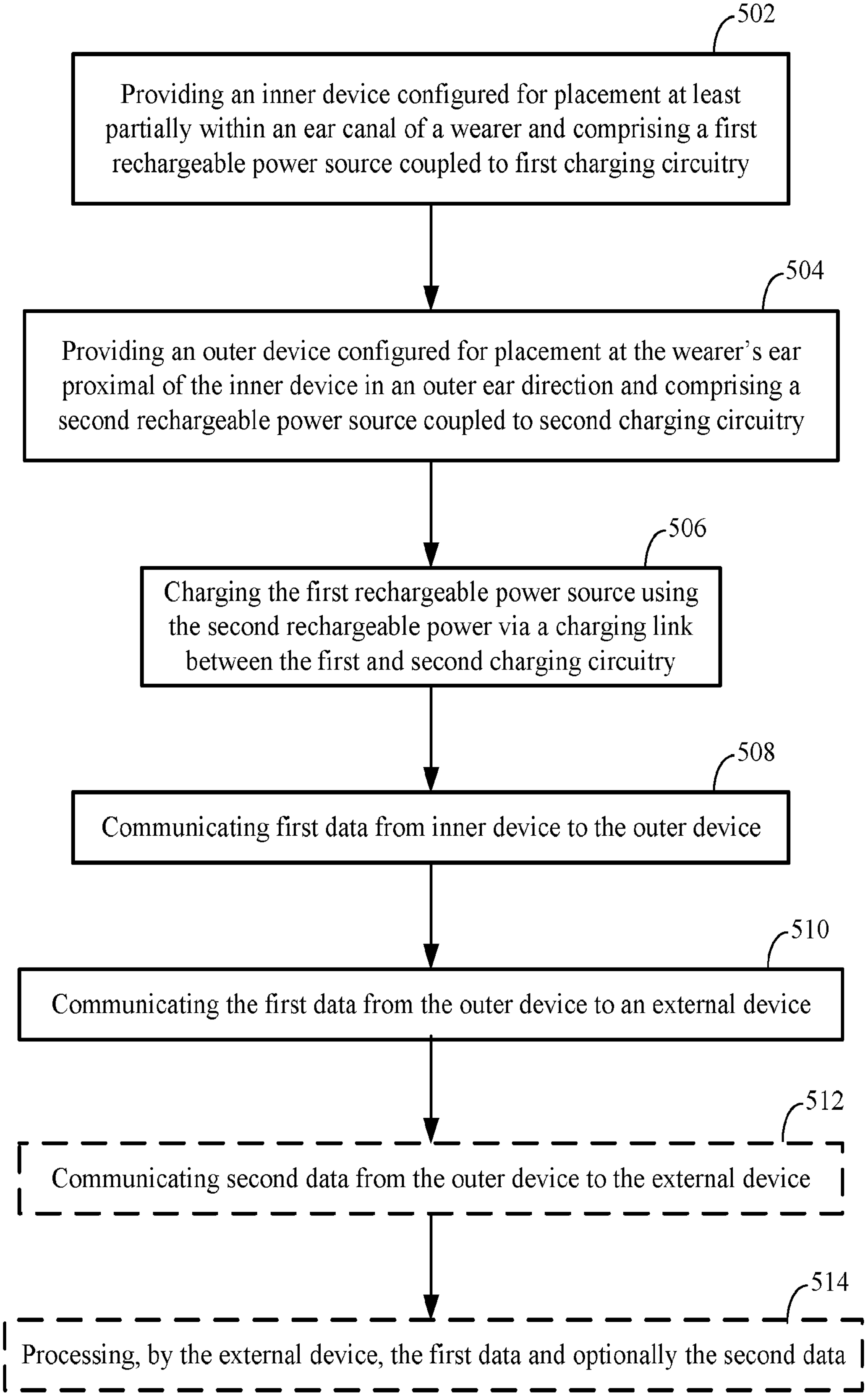
FIG. 5 illustrates a method of cooperative operation between an inner device and an outer device of an ear-worn electronic system in accordance with any of the embodiments disclosed herein.

FIG. 5 illustrates a method of cooperative operation between an inner device and an outer device of an ear-worn electronic system in accordance with any of the embodiments disclosed herein. The method shown in FIG. 5 involves providing 502 an inner device configured for placement at least partially within an ear canal of the wearer. The inner device comprises a first rechargeable power source coupled to first charging circuitry. The method involves providing 504 an outer device configured for placement at the wearer's ear proximal of the inner device in an outer ear direction. The outer device comprises a second rechargeable power source coupled to second charging circuitry. The method also involves charging 506 the rechargeable power source using the second rechargeable power via a charging link between the first and second charging circuitry. The method further involves communicating 508 first data from the inner device to the outer device. The first data comprises data acquired or generated by the inner device. The method also involves communicating 510 the first data from the outer device to an external device. The external device may be a charging unit and/or a cloud processor, for example. The method may involve communicating 512 second data from the outer device to the external device. The second data comprises data acquired or generated by the outer device. The method may further involve processing 514, by the external device, the first data and optionally the second data. The method may also involve processing, by the outer device, the first data and the second data.

Figure 6:
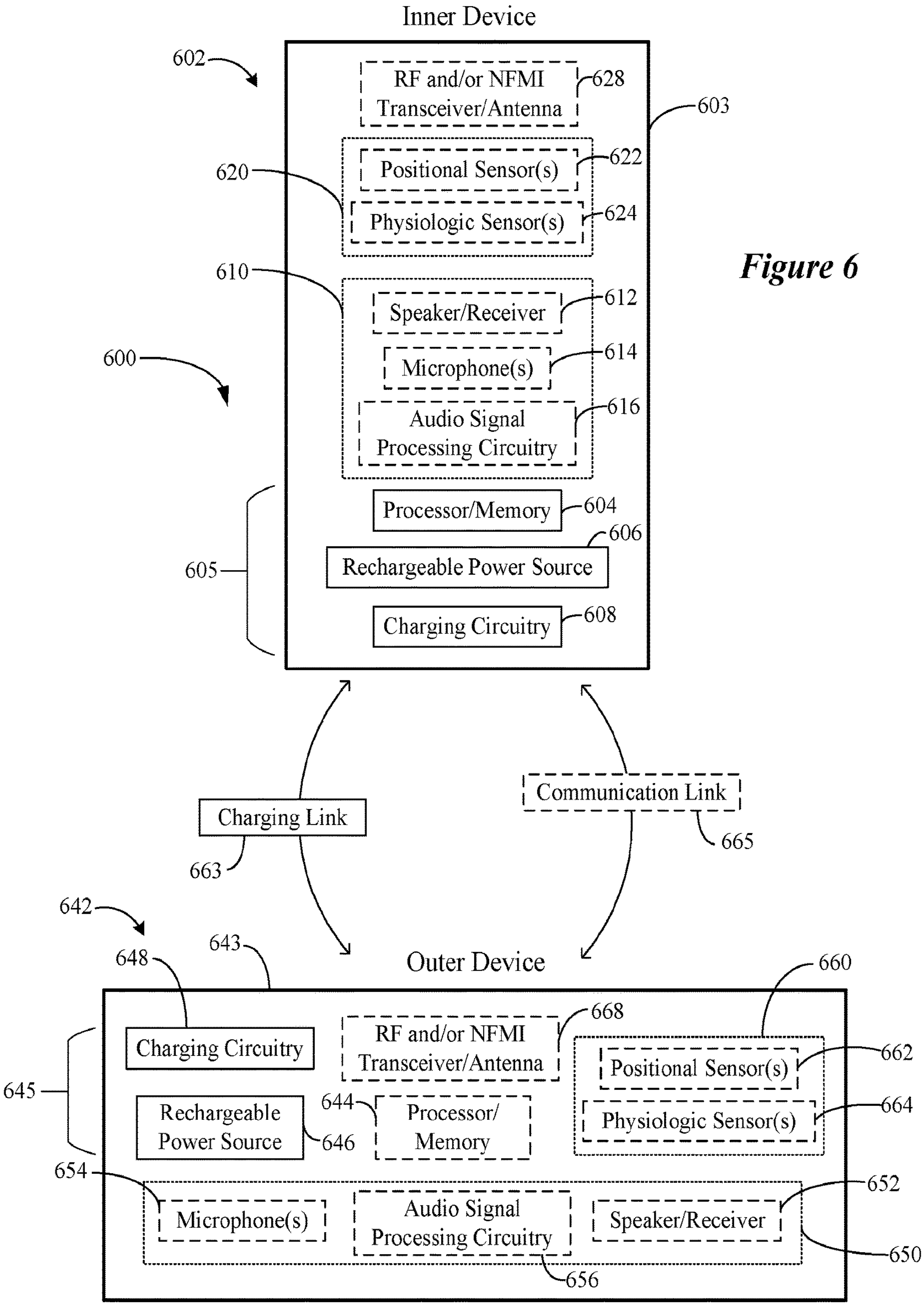
FIG. 6 is a block diagram of an ear-worn electronic system comprising an inner device and an outer device in accordance with any of the embodiments disclosed herein.

FIG. 6 is a block diagram of an ear-worn electronic system 600 comprising an inner device 602 and an outer device 642 in accordance with any of the embodiments disclosed herein. The inner device 602 comprises a housing 603 configured for placement partially or entirely within an ear canal of the wearer of the system 600. The shape of the housing 603 can be customized for the wearer's ear canal (e.g., based on a mold taken from the wearer's ear canal). In some configurations, the housing 603 can be constructed from pliant (e.g., semisoft) material that, when inserted into the wearer's ear canal, takes on the shape of the ear canal.

The inner device 602 includes a number of components that can vary depending on the configuration and functionality of the inner device 602 and that of the outer device 642. Typically, each of the various configurations of the inner device 602 includes a number of core component 605. In the representative embodiment shown in FIG. 6, the core components 605 of the inner device 602 include a processor 604 coupled to memory, a rechargeable power source 606, and charging circuitry 608. The outer device 642 includes a number of components that can vary depending on the configuration and functionality of the outer device 642 and that of the inner device 602. Typically, each of the various configurations of the outer device 642 includes a number of core components 645. In the representative embodiment shown in FIG. 6, the core components 645 of the outer device 642 include a rechargeable power source 646 and charging circuitry 648. In a basic configuration of the system 600, the core components 605, 645 of the inner and outer devices 602, 642 cooperate to facilitate charging of the rechargeable power source 606 of the inner device 602 using the rechargeable power source 646 of the outer device 642 via a charging link 663 when in a connected configuration.

With reference to the core components 605 of the inner device 602, the processor 604 and memory provide for enhanced functionality depending on additional components provided within and/or on the inner device 602. For example, in addition to the core component 605, the inner device 602 can include one or more of an audio processing facility 610, a sensor facility 620, and a communication facility 628. The audio processing facility 610 can include audio signal processing circuitry 616, one or more microphones 614, and/or a speaker or receiver 612. The sensor facility 620 can include one or more physiologic sensors 624 and/or one or more positional sensors 622. The communication facility 628 can include a radiofrequency (RF) transceiver and antenna and/or a near field magnetic induction (NFMI) transceiver and antenna.

In addition to the core components 645 of the outer device 642, incorporation of other components provide for enhanced functionality depending on the additional components provided within and/or on the outer device 642. For example, in addition to the core components 645, the outer device 642 can include one or more of an audio processing facility 650, a sensor facility 660, and a communication facility 668. The audio processing facility 650 can include audio signal processing circuitry 656, one or more microphones 654, and/or a speaker or receiver 652. The sensor facility 660 can include one or more physiologic sensors 664 and/or one or more positional sensors 662. The communication facility 668 can include an RF transceiver and antenna and/or an NFMI transceiver and antenna.

The system 600 shown in FIG. 6 includes a charging link 663 establish between the charging circuitry 608 of the inner device 602 and charging circuitry 648 of the outer device 642. The charging link 663 can be a wired link or a wireless link, representative examples of which are provided hereinbelow. When in a connected configuration, the charging link 663 facilitates charging of the rechargeable power source 606 of the inner device 602 using the rechargeable power source 646 of the outer device 642. After the charging link 663 has been terminated (typically by physically separating the inner and outer devices 602, 642 by the wearer), the inner device 602 can operate in an independent or standalone mode, and the outer device 642 can be placed in a charging unit to facilitate charging of the rechargeable power source 646.

In some embodiments, the inner and outer devices 602, 642 can communicate with one another and/or an external device via communication facilities 628, 668. Typically, the communication facilities 628, 668 are configured for communication when the inner and outer devices 602, 642 are in a connected configuration. In some configurations, one or both of the communication facility 628, 668 can be configured for communication when the inner and outer devices 602, 642 are in a disconnected configuration. The communication facilities 628, 668 can support a communication link 665 between the inner and outer devices 602, 642. In some configurations, the inner and outer devices 602, 642 can communicate via the charging link 663, in which case one or both of the communications facilities 628, 668 need not be included. Various types of data can be transferred between the processor/memory 604 of the inner device 602 and the processor/memory 644 of the outer device 642 via the communication link 665 and/or the charging link 663. As was discussed previously, data acquired or generated by one or both of the inner and outer devices 602, 642 can be transferred to an external processor (e.g., a charging unit processor and/or cloud processor) for storage and/or analysis.

For example, physiologic and/or positional sensor data acquired by the processor/memory 604 of the inner device 602 can be transferred to the processor/memory 644 of the outer device 642 via the communication link 665. By way of further example, various data can be transferred from the processor/memory 644 of the outer device 642 to the processor/memory 604 of the inner device 602, such as firmware updates and/or parameter changes, some of which may be recommendations based on an analysis of data previously acquired from the inner and/or outer devices 602, 642. It is noted that, in accordance with some embodiments, various types of data can be transferred between the inner and outer devices 602, 642 via the charging link 663 rather than a separate communication link 665, thereby obviating the need for components to support the communication link 665.

Table 1 below provides examples of various inner device configurations that differ in terms of components and functionality. Table 2 below provides examples of various outer device configurations that differ in terms of components and functionality. In Tables 1 and 2 below, inclusion of a particular component or function is indicated by an "X," exclusion of a particular component or function is indicated by a blank (absence of a symbol), and an "0" indicates that a particular component or function is optional (optionally included or optionally excluded). Any of the representative inner device configurations of Table 1 can be combined with any of the representative outer device configurations of Table 2 depending on the requirements and features of a particular ear-worn electronic system. It is understood that the device configurations shown in Tables 1 and 2 represent several of many possible configurations, and that other inner and outer device configurations are contemplated.

TABLE 1

| Inner Device Configuration | Recharg. Power Supply | Charging Circuitry | Charging Link | Comm Link | Processor/ Memory | Mic(s) | Speaker/ Receiver | Sensor(s) |
|---|---|---|---|---|---|---|---|---|
| Config A1 | X | X | X | O | X | X | X | O |
| Config A2 | X | X | X | O | X | X | | O |
| Config A3 | X | X | X | O | X | | X | O |
| Config A4 | X | X | X | O | X | X | X | X |
| Config A5 | X | X | X | O | X | | | X |

TABLE 2

| Outer Device Configuration | Recharg. Power Supply | Charging Circuitry | Charging Link | Comm Link | Processor/ Memory | Mic(s) | Speaker/ Receiver | Sensor(s) |
|---|---|---|---|---|---|---|---|---|
| Config B1 | X | X | X | O | | | | |
| Config B2 | X | X | X | O | X | | | O |
| Config B3 | X | X | X | O | X | X | | O |
| Config B4 | X | X | X | O | X | | X | O |
| Config B5 | X | X | X | O | X | X | X | |
| Config B6 | X | X | X | O | X | X | X | X |

In accordance with any of the embodiments disclosed herein, one or both of the inner and outer devices of an ear-worn electronic system can include one or more microphones. Representative microphones include omnidirectional microphones, directional microphones, microphone arrays, directional microphone arrays, phased array directional microphones, and any combination of these types of microphones. In accordance with any of the embodiments disclosed herein, one or both of the inner and outer devices of an ear-worn electronic system can include one or more physiologic sensors. Representative physiologic sensors include, but are not limited to, an EKG or ECG sensor, a pulse oximeter, a respiration sensor, a temperature sensor, a glucose sensor, an EEG sensor, an EMG sensor, an EOG sensor, or a galvanic skin response sensor. Representative examples of such sensors are disclosed in US Pat. Pub. Nos. 2018/0014784 (Heeger et al.), 2013/0216434 (Ow-Wing), and 2010/0253505 (Chou), and in U.S. Pat. No. 9,445,768 (Alexander et al.) and U.S. Pat. No. 9,107,586 (Bao), each of which is incorporated herein by reference in its entirety.

In accordance with any of the embodiments disclosed herein, one or both of the inner device and the outer device of an ear-worn electronic system can include one or more positional sensors. Representative positional sensors include, but are not limited to, accelerometers, gyroscopes, magnetometers, inertial measurement units (IMUs), GPSs or any combination of these sensors. In accordance with any of the embodiments disclosed herein, one or both of the inner device and the outer device of an ear-worn electronic system can include one or more communication devices. Representative communication devices include, but are not limited to, an RF transceiver coupled to an RF antenna, an NFMI transceiver coupled to a magnetic antenna, or a combination of these transceivers and antennas. For example, one or both of the inner device and the outer device can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2, 5.0 or 5.1) specification, for example. It is understood that the inner device and/or outer device can employ other radios, such as a 900 MHz radio. In addition, or alternatively, one or both of the inner device and the outer device can include an NFMI sensor for effecting short-range communications (e.g., inner-to-outer device communications, ear-to-ear communications).

The electronic circuitry of the inner and outer devices can be implemented to incorporate a processor (e.g., processor 604, 644). The electronic circuitry of one or both of the inner and outer devices can include or exclude audio signal processing circuitry (e.g., a digital signal processor (DSP)) depending on desired functionality and features. The processor can be representative of any combination of one or more logic devices (e.g., multi-core processor, digital signal processor (DSP), microprocessor, programmable controller, general-purpose processor, special-purpose processor, hardware controller, software controller, a combined hardware and software device), filters (e.g., FIR filter, Kalman filter), memory (FLASH, RAM, ROM etc.), other digital logic circuitry (e.g., ASICs, FPGAs), and software/firmware configured to implement the functionality disclosed herein. The electronic circuitry can include or be coupled to one or more types of memory, including ROM, RAM, SDRAM, NVRAM, EEPROM, and FLASH, for example.

A charging unit in accordance with any of the embodiments disclosed herein includes a power source configured to provide energy for charging the rechargeable power source of an outer device of an ear-worn electronic system. In some embodiments, the power source of a desk-top charging unit can include an AC-to-DC converter configured to receive power from a standard wall socket. In other embodiments, the power source of a portable charging unit can include a rechargeable power source, such as one or more lithium-ion batteries. It is understood that the rechargeable power source of the charging unit and the inner and outer devices need not be a lithium-ion battery. For example, the rechargeable power source of one or more of the charging unit, the inner device, and the outer device can be a high power density type such as thin film Li-ion, Li-titanate, Li-titanate supercapacitor hybrid, or other type of supercapacitor.

As was discussed previously, the inner device 602 can be configured for continuous or nearly continuous deployment and operation within a wearer's ear. The outer device 642 can be used during periods of wearer wakefulness. In some configurations, the rechargeable power source 606 of the inner device 604 can have a capacity sufficient to power the inner device 602 for operation at least during the wearer's sleeping hours of a 24-hour period. In such configurations, the rechargeable power source 646 of the outer device 642 can have a capacity sufficient to charge the rechargeable power source 606 with energy sufficient to power the inner device 602 for operation during the wearer's wakefulness hours of the 24 hour period and subsequent sleeping hours of a subsequent 24 hour period.

In other configurations, the inner device 602 can be configured for continuous use within the wearer's ear for a duration longer than a duration of inner device operation using a single charge of the rechargeable power source 606. In such configurations, the outer device 642 is configured to charge the rechargeable power source 606 to support continuous use of the inner device 602 within the wearer's ear for a duration longer than the duration of inner device operation using the single charge of the rechargeable power source 606.

In further configurations, the inner device 602 can be configured to be worn by the wearer continuously during a period of time that includes wearer sleep, and the outer device 642 can be configured to be worn by the wearer during wakefulness of the wearer. In other configurations, the inner device 602 can be configured for substantially round-the-clock deployment within the wearer's ear, and the outer device 642 can be configured for deployment at the wearer's ear during wakefulness of the wearer. Various other deployment configurations are contemplated.

Figure 7:
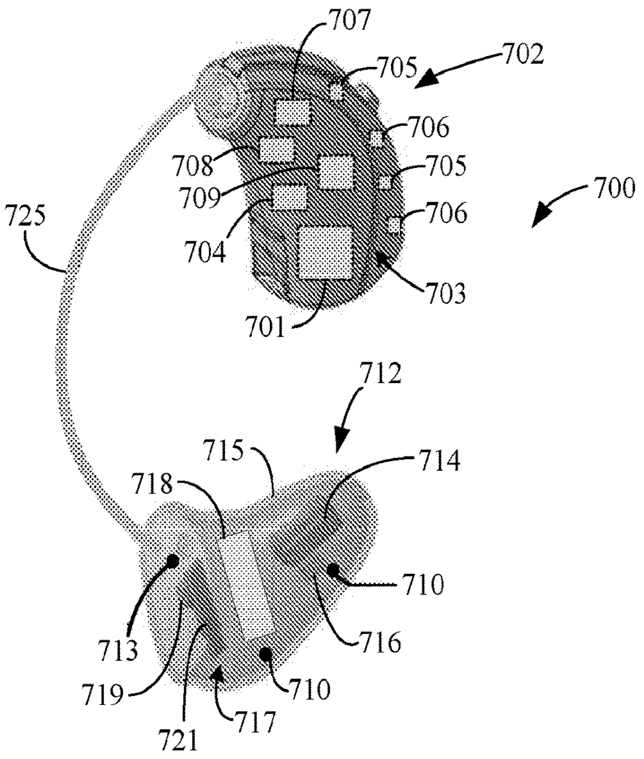
FIG. 7 illustrates an ear-worn electronic system comprising an inner device and an outer device deployed at a wearer's ear in a connected configuration in accordance with any of the embodiments disclosed herein.
Figure 8A:
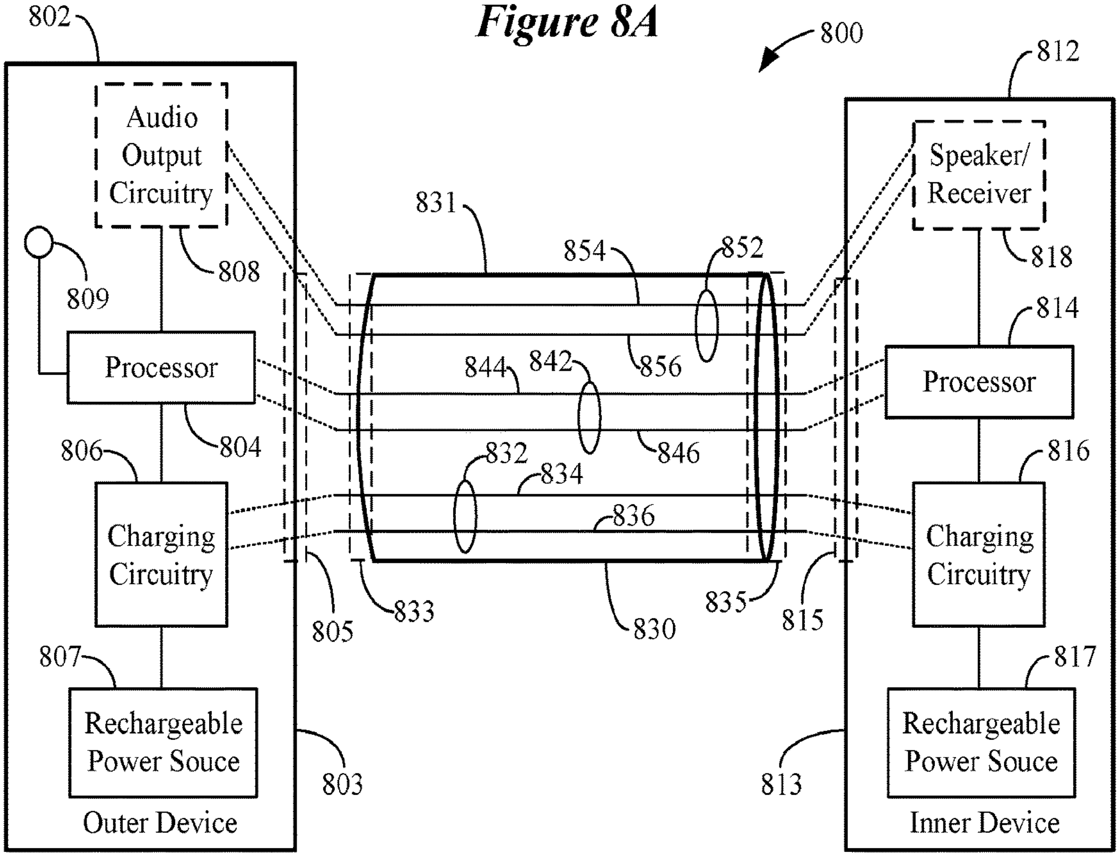
FIG. 8A illustrates an ear-worn electronic system comprising an inner device connected to an outer device via a wired charging link in accordance with any of the embodiments disclosed herein.

FIG. 7 illustrates an ear-worn electronic system 700 comprising an inner device 712 and an outer device 702 deployed at a wearer's ear in a connected configuration in accordance with any of the embodiments disclosed herein. The inner device 712 is configured for deployment at least partially within an ear canal of the wearer. In the representative embodiment shown in FIG. 7, the inner device 712 is configured as a CIC-type device having a distal end configured to extend beyond the first bend, and typically terminate prior to the second bend, of the ear canal. The inner device 712 can include a custom shell 715 having a configuration that corresponds to the shape of the wearer's ear canal (e.g., molded to the wearer's ear canal). The outer device 702 is configured as a BTE-type device configured for deployment behind the wearer's ear. In the embodiment shown in FIG. 7, the inner device 712 is connected to the outer device 702 via a wired charging link 725, a representative embodiment of which is illustrated in FIG. 8A. As was previously discussed, the inner device 712 can alternatively be coupled to the outer device 702 via a wireless charging link, an embodiment of which is illustrated in FIG. 8D.

The inner device 712 includes circuitry 717 comprising at least a rechargeable power source 718, charging circuitry 721, and a processor 719 coupled to memory. The processor 719 can include or exclude an audio signal processing facility (e.g., an analog front-end, a DSP). As was discussed previously with reference to Table 1 above, and depending on desired functionality and features, the inner device 712 can include (or exclude) a speaker/receiver 714, one or more microphones 713, one or more physiologic sensors 710, and one or more positional sensors 716. The outer device 702 includes circuitry 703 comprising at least a rechargeable power source 701 and charging circuitry 709. As was discussed previously with reference to Table 2 above, and depending on desired functionality and features, the outer device 702 can include (or exclude) a processor 704 coupled to memory, one or more microphones 705, one or more physiologic sensors 706, one or more positional sensors 708 and a speaker 707. The processor 704 can include or exclude an audio signal processing facility (e.g., an analog front-end, a DSP).

In some embodiments, each of the inner device 712 and outer device 702 is configured to operate as an ear-worn electronic hearing device (e.g., personal amplification device, hearing instrument, hearing aid). In such embodiments, each of the inner device 712 and outer device 702 can further be configured to collect physiologic sensor data from the wearer. In other embodiments, only one of the inner device 712 and outer device 702 is configured to operate as an ear-worn electronic hearing device, and the other of the inner device 712 and outer device 702 is configured to collect physiologic sensor data. For example, the outer device 702 can be configured to operate as an ear-worn electronic hearing device (e.g., a hearing aid-type device operable during wakefulness of the wearer), and the inner device 712 can be configured to collect physiologic and/or positional sensor data (e.g., during the wearer's sleep). In such embodiments, the outer device 702 may also be configured to collect physiologic and/or positional sensor data.

FIG. 8A illustrates an ear-worn electronic system 800 comprising an inner device 812 connected to an outer device 802 via a wired charging link 830 in accordance with any of the embodiments disclosed herein. In the representative embodiment shown in FIG. 8A, the inner device 812 includes a processor 814 coupled to memory, charging circuitry 816, a rechargeable power source 817, and a speaker or receiver 818. The outer device 802 includes a processor 804 coupled to memory, charging circuitry 806, a rechargeable power source 807, and audio output circuitry 808. As was previously discussed, the inner and outer devices 812, 802 can include or exclude at least some of the components shown in FIG. 8A depending on desired functionality and features (see, e.g., Tables 1 and 2 above).

The wired charging link 830 is physically connected to connector interfaces 815, 805 provided on the housing 813, 803 of the inner and outer devices 812, 802. The wired charging link 830 can be implemented as a flexible polymeric tube within which a number of electrical conductors are disposed and separated by insulation. The electrical conductors can be pliable wires, conductive traces disposed on one or more layers of a flexible circuit board, or a combination of these conductive elements. Respective ends of the wired charging link 830 terminate at connectors 833, 835 configured to physically and electrically connect with and disconnect from connector interfaces 815, 805 via manual manipulation by the wearer. Prior to, during, and/or after a charging procedure, the state of charge and/or charge status of the rechargeable power source 817 of the inner device 812 can be communicated to the wearer audibly (via the speaker/receiver 818) and/or visually via an LED 809 disposed on the housing 803 of the outer device 802. It is understood that an LED 809 can be disposed on either or both of the housing 803 of the outer device 802 and the housing 813 of the inner device 812 (e.g., depending on the size and visibility of the inner device 812). Alternatively or additionally, the ear-worn electronic system 800 (e.g., at least one of the outer device 802 and the inner device 812) can communicate a status and/or alert message on a smartphone or other device externally of, and communicatively coupled to, the ear-worn electronic system 800.

In the representative embodiment shown in FIG. 8A, the wired charging link 830 includes a charging link 832 comprising at least a pair of electrical conductors 834, 836 coupled to charging circuitry 816, 806 of the inner and outer devices 812, 802. In addition to the charging link 832, the wired charging link 830 can optionally include a data link 842 comprising one or more electrical conductors 844, 846 coupled to the processors 814, 804 of the inner and outer devices 812, 802. The wired charging link 830 can optionally include an audio signal link 852 comprising a number of conductors 854, 856 coupled to a speaker/receiver 818 of the inner device 812 and audio output circuitry 808 of the outer device 802. In some embodiments, the audio signal link 852 can comprise a hollow tube configured to can communicate sound between the audio output circuitry 808 of the outer device 802 and a passive receiver 818 of the inner device 812.

Figure 8B:
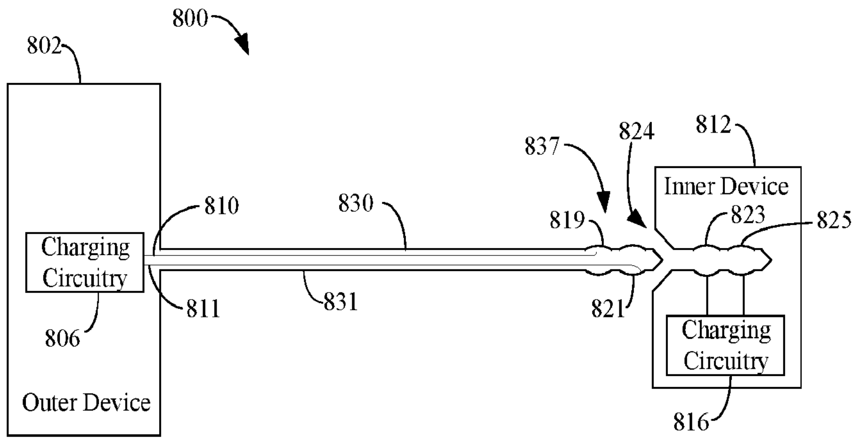
FIG. 8B illustrates a wired charging link configured to provide wired connectivity between an outer device and an inner device of an ear-worn electronic system deployed at a wearer's ear in accordance with any of the embodiments disclosed herein.
Figure 8C:
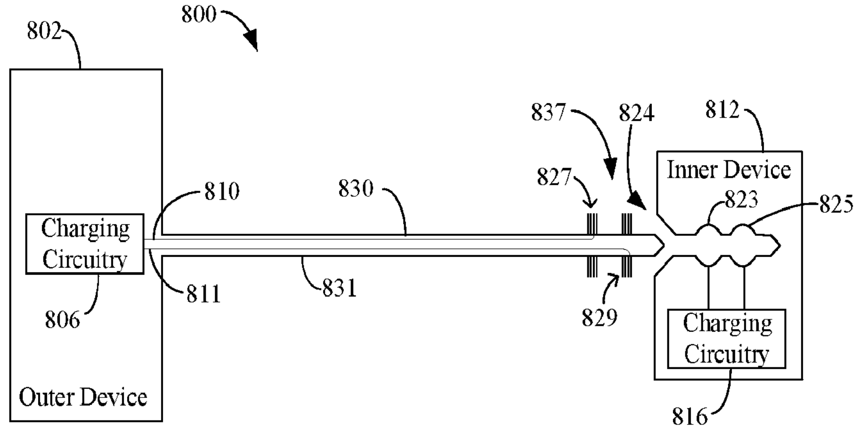
FIG. 8C illustrates a wired charging link configured to provide wired connectivity between an outer device and an inner device of an ear-worn electronic system deployed at a wearer's ear in accordance with any of the embodiments disclosed herein.
Figure 8D:
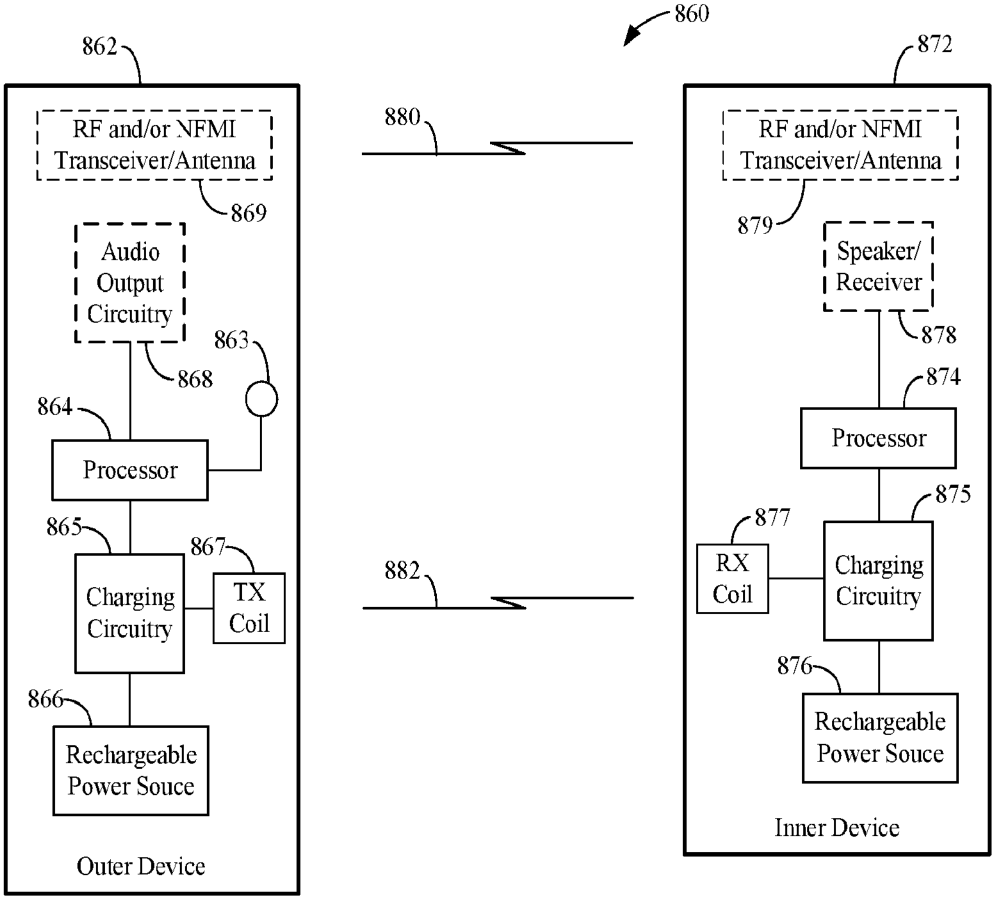
FIG. 8D illustrates an ear-worn electronic system comprising an inner device coupled to an outer device via a wireless charging link in accordance with any of the embodiments disclosed herein.

FIGS. 8B and 8C illustrate a wired charging link 830 configured to provide wired connectivity between an outer device 802 and an inner device 812 of an ear-worn electronic system 800 deployed at a wearer's ear in accordance with any of the embodiments disclosed herein. For purposes of clarity, the charging circuitry 806, 816 of the outer and inner devices 802, 812 is shown in FIGS. 8B and 8C, and other circuitry and components are excluded. As was previously discussed, the wired charging link 830 can be implemented as a flexible polymeric tube 831 within which a number of electrical conductors are disposed. The electrical conductors can be pliable wires, conductive traces disposed on one or more layers of a flexible circuit board, or a combination of these conductive elements.

An electrical connector 837 is disposed at a distal end of the tube 831 and is configured to be received by a connection port 824 of the inner device 812 when the wearer connects the outer device 802 to the inner device 812. The connection port 824 can have a funnel shape or other structure that helps to guide the distal end of the tube 831 into the connection port 824. A first conductor 810 is coupled to the charging circuit 806, extends through the tube 831, and terminates at a first contact 819 of the connector 837. A second conductor 811 is coupled to the charging circuitry 806, extends through the tube 831, and terminates at a second contact 821. The first and second contacts 819, 821 are electrically insulated from each other. When the connector 837 is inserted into the connection port 824, the first and second contact 819, 821 deform or collapse to allow the connector 837 to properly seat within the connection port 824.

The connection port 824 includes a third contact 823 and a fourth contact 825, which are electrically insulated from each other and respectively coupled to the charging circuitry 816 of the inner device 812. When the connector 837 is properly seated within the connection port 824, the first and second contacts 819, 821 expand and electrically connect with respective third and fourth contact 823, 825 of the connection port 824. Alternatively, the walls of the connection port 824 can be formed from deformable material, which provides for distention of the third and fourth contacts 823, 825 and reception of rigid first and second contacts 819, 821 of the connector 837. With the connector 837 properly seated within the connection port 824, the charging circuitry 806 of the outer device 802 is electrically coupled to the charging circuitry 816 of the inner device 812. It is noted that other conductors and corresponding contacts of the connector 837 and connection port 824 can be incorporated to provide for connectivity between other components of the outer and inner devices 802, 812 (e.g., processors, audio components, sensors).

The wired charging link 830 shown in FIG. 8C is similar to that shown in FIG. 8B, but differs in terms of the type of electrical contacts 827, 829 of the connector 837 disposed at the distal end of the tube 831. In the embodiment shown in FIG. 8C, each of the first and second contacts 827, 829 of the connector 837 comprises a set of electrically conductive, flexible bristles. The first and second contacts 827, 829 are electrically insulated from each other. When the connector 837 is inserted into the connection port 824, flexible bristles of the first and second contacts 827, 829 fold downwardly toward or onto the surface of tube 831 allowing the connector 837 to properly seat within the connection port 824. When properly seated, the flexible bristles of the first and second contacts 827, 829 extend upwardly from the tube surface in an attempt to resume their original orientation (e.g., substantially perpendicular to the surface of the tube 831) and establish electrical connectivity with the third and fourth contacts 823, 825 of the connection port 824.

Additional details of a connector 837 comprising flexible bristle contacts 827, 829 are disclosed in commonly owned U.S. Patent Application Ser. No. 62/884,037 filed on Aug. 7, 2019, which is incorporated herein by reference.

A variety of different mechanisms are contemplated for detachably coupling the distal end of the tube 831 to the housing of the inner device 812 and establishing electrical connectivity between circuitry of the outer and inner devices 802, 812. In some configurations, a connection mechanism similar to that used to connect a receiver cable to a RIC-type device can be used. Other configurations can employ a snap connector (e.g., a telephone or Ethernet-type connector), a twist connector (e.g., a BNC-type connector) or any other connector that can provide a somewhat secure locking mechanism.

FIG. 8D illustrates an ear-worn electronic system 860 comprising an inner device 872 coupled to an outer device 862 via a wireless charging link 882 in accordance with any of the embodiments disclosed herein. In the representative embodiment shown in FIG. 8D, the inner device 872 includes a processor 874 coupled to memory, charging circuitry 875 coupled to a receive (RX) coil 877, a rechargeable power source 876, and a speaker or receiver 878. The outer device 862 includes a processor 864 coupled to memory, charging circuitry 865 coupled to a transmit (TX) coil 867, a rechargeable power source 866, and audio output circuitry 868. As was previously discussed, the inner and outer devices 872, 862 can include or exclude at least some of the component shown in FIG. 8D depending on desired functionality and features (see, e.g., Tables 1 and 2 above).

In the representative embodiment shown in FIG. 8D, the wireless charging link 882 is supported by cooperation between the transmit coil 867 of the outer device 862 and the receive coil 877 of the inner device 872. For example, the transmit coil 867 can be configured to generate an electromagnetic field to transfer energy to the receive coil 877 via electromagnetic induction. Energy is transmitted through an inductive coupling between the transmit and receive coils 867, 877 for delivery to charging circuitry 875 which, in turn, charges the rechargeable power source 876 of the inner device 872. Prior to, during, and/or after a charging procedure, the state of charge and/or charge status of the rechargeable power source 876 of the inner device 872 can be communicated to the wearer audibly (via the speaker/receiver 878) and/or visually via an LED 863 disposed on the housing of the outer device 862. It is understood that an LED 863 can be disposed on either or both of the housing of the outer device 862 and the housing of the inner device 872 (e.g., depending on the size and visibility of the inner device 872). Alternatively or additionally, the ear-worn electronic system 860 (e.g., at least one of the outer device 862 and the inner device 872) can communicate a status and/or alert message to a smartphone or other device externally of, and communicatively coupled to, the ear-worn electronic system 860.

According to some embodiments, the transmit coil 867, receive coil 877, and charging circuitry 865, 875 are configured to implement inductive charging of the rechargeable power source 876 of the inner device 872 in accordance with the Qi open interface standard developed by the Wireless Power Consortium. In other embodiments, the transmit coil 867, receive coil 877, and charging circuitry 865, 875 are configured to support resonant inductive coupling, which can provide for the transfer of energy at greater separation distances between the inner and outer devices 872, 862. In some configurations, a resonant circuit is coupled to the receive coil 877. In other configurations, a first resonant circuit is coupled to the receive coil 877 and a second resonant circuit is coupled to the transmit coil 867. The transmit coil 867 and receive coil 877 can have similar designs and operate at the same resonant frequency, which can provide for a low impedance at the transmit coil frequency and efficient transmission of energy from the transmit coil 867 to the receive coil 877. To remove energy from the receive coil 877, various methods can be used. For example, energy received by the receive coil 877 can be used directly or rectified, and a regulator circuit of the charging circuitry 875 can be used to generate DC voltage.

In some embodiments, the inner and outer devices 872, 862 can communicate wirelessly with one another and/or an external device via wireless communication facilities 879, 869. Typically, the wireless communication facilities 879, 869 are configured for communication when the inner and outer devices 872, 862 are in a connected configuration. In some configurations, one or both of the wireless communication facilities 879, 869 can be configured for communication when the inner and outer devices 872, 862 are in a disconnected configuration. The wireless communication facilities 879, 869 can each include a BLE transceiver and antenna. In addition or alternatively, the wireless communication facilities 879, 869 can include an NFMI transceiver and antenna. Various types of data can be transferred between the processor/memory 874 of the inner device 872 and the processor/memory 864 of the outer device 862 via the communication facilities 879, 869. As was discussed previously, data acquired or generated by one or both of the inner and outer devices 872, 862 can be transferred to an external processor (e.g., a charging unit processor and/or cloud processor) for storage and/or analysis.

Figure 9:
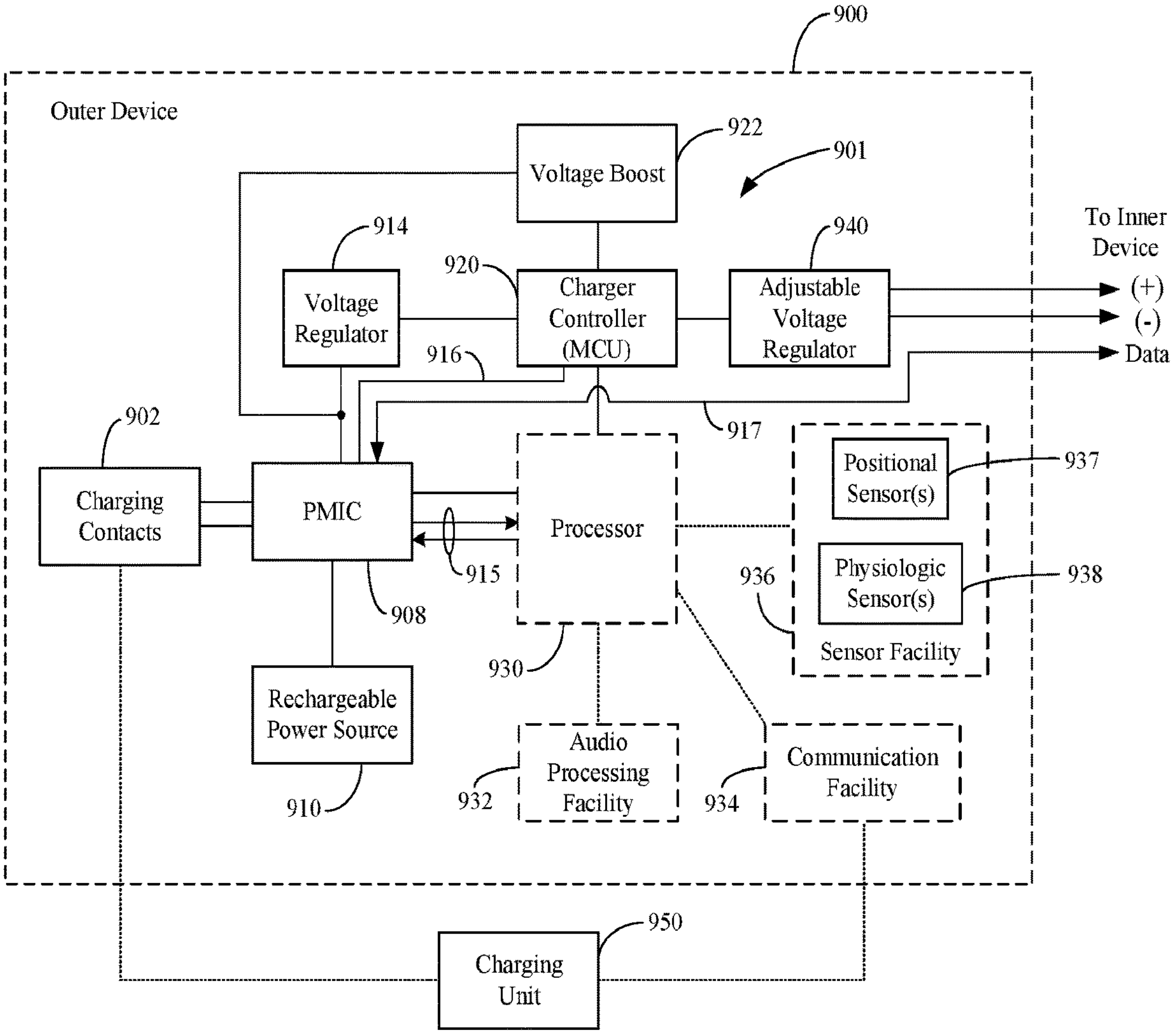
FIG. 9 is a block diagram of an outer device of an ear-worn electronic system in accordance with any of the embodiments disclosed herein.
Figure 10:
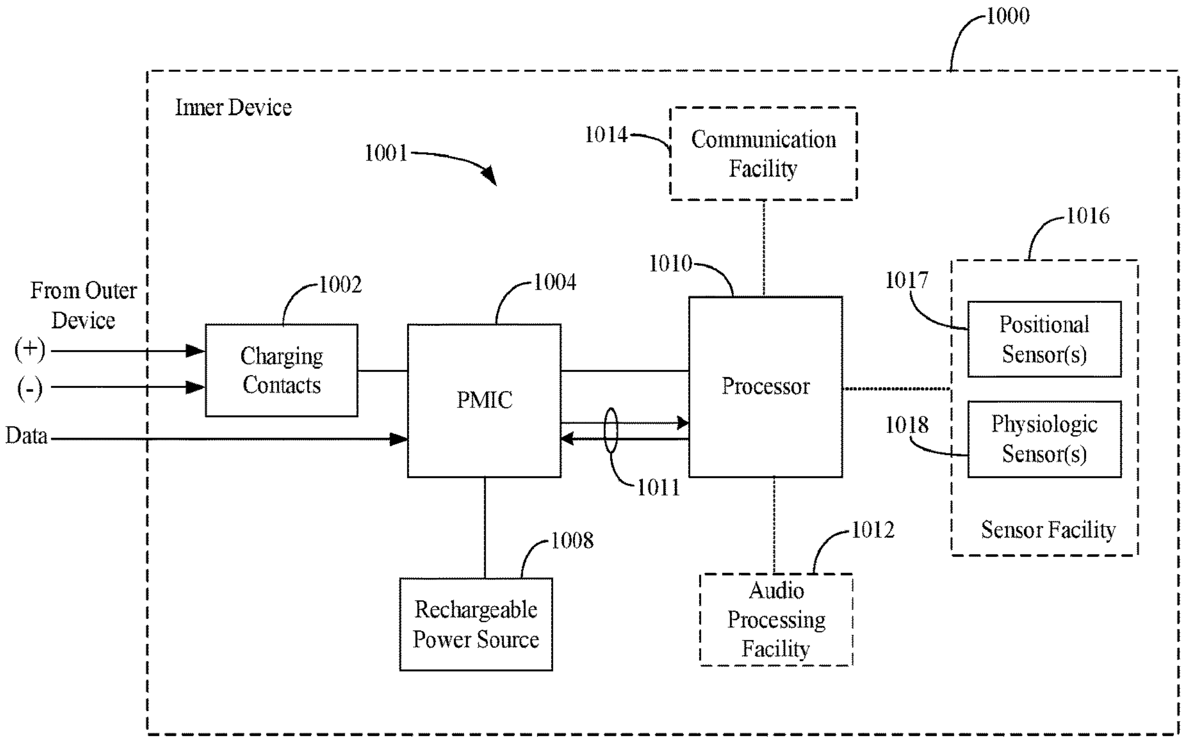
FIG. 10 is a block diagram of an inner device of an ear-worn electronic system in accordance with any of the embodiments disclosed herein.

FIG. 9 is a block diagram of an outer device of an ear-worn electronic system in accordance with any of the embodiments disclosed herein. FIG. 10 is a block diagram of an inner device of an ear-worn electronic system in accordance with any of the embodiments disclosed herein. The representative outer device 900 shown in FIG. 9 includes, in a minimal configuration, charging circuitry 901 and a rechargeable power source 910. In more complex configurations, the electronic circuitry of the outer device 900 can include a processor 930, and the outer device 900 can include additional facilities as specified in Table 2 above. The representative inner device 1000 shown in FIG. 10 includes, in a minimal configuration, charging circuitry 1001, a rechargeable power source 1008, and a processor 1010. In more complex configurations, the inner device 1000 can include additional facilities as specified in Table 1 above.

The outer device 900 includes charging contacts 902 configured to electrically connect to corresponding charge port contacts of a charging unit 950. In some embodiments, instead of the charging contacts 902, the outer device 900 includes a receive coil configured to inductively couple to a transmit coil of the charging unit 950. The charging contacts 902 are coupled to a power management IC (PMIC) 908, which can include a temperature sensor (not shown). A suitable PMIC is the HPM10 Power Management IC available from ON Semiconductor. The PMIC 908 is configured to implement charging processes (e.g., standard and accelerated charging processes) and generate the voltage needed to charge a rechargeable power source 910 (e.g., lithium-ion battery) of the outer device 900 when the outer device 900 is placed in a charge port of a charging unit 950. The PMIC 908 is also configured to generate the voltage needed by the inner device 1000 and cooperates with charging circuitry 1001 to manage the charging processes (e.g., standard and accelerated charging processes) implemented for charging a rechargeable power source 1008 of the inner device 1000 when in a connected configuration.

The PMIC 908 of the outer device 900 includes a charger communication interface configured to inform the processor 930 and/or the charging unit 950 about the charge state and charging progress of one or both of the outer device 900 and the inner device 1000. The charger communication interface of the PMIC 908 can communicate charging-related information to the processor 930 and/or the charging unit 950 (and/or other external device) via the charging contacts 902 and/or via a communication facility 934 (e.g., BLE transceiver and antenna) coupled to the processor 930. For example, the charging unit 950 can be configured to communicate with the PMIC 908 via a modulated voltage signal communicated through the charging contacts 902. The PMIC 908 can be configured to communicate with the charging unit 950 via a modulated current signal transmitted through the charging contacts 902. Various types of charging-related information, such as voltage levels, current levels, temperature, and different types of power source failures, can be communicated to the processor 930, the charging unit 950, and/or other external devices.

The PMIC 908 is coupled to processor 930, which can be a digital signal processor (DSP). The PMIC 908 and processor 930 communicate via power control lines 915. For example, the PMIC 908 can inform the processor 930 about the charge state of the rechargeable power source 910 of the outer device 900. The PMIC 908 can communicate with charging circuitry of the inner device (e.g., PMIC 1004) via data link 917 to inform the processor 930 about the charge state and charge progress of the rechargeable power source 1008 of the inner device 1000. The processor 930 can be coupled to one or more other facilities of the outer device 900. For example, the processor 930 can be operatively coupled to an audio processing facility 932, which can include any one or combination of one or more microphones, a speaker/receiver, analog front-end, DSP, and various analog and digital filters. The processor 930 can be operatively coupled to a communication facility 934, which can include one or both of an RF transceiver/antenna facility and an NFMI transceiver/antenna facility. The processor 930 can be operatively coupled to a sensor facility 936, which can include anyone or a combination of one or more physiologic sensors 938 and one or more positional sensors 937.

The PMIC 908 is coupled to a charger controller (microcontroller unit or MCU) 920 by control line 916. The PMIC 908 is configured to manage charging of the rechargeable power source 910 and to supply power to other circuitry via the voltage regulator 914. The voltage regulator 914 can be configured to provide a stable voltage (e.g., 3.3 V) for various components of the outer device 900. As was previously discussed, the PMIC 908 of the outer device 900 cooperates with the PMIC 1004 of the inner device 1000 via data link 917 to manage charging of the rechargeable power source 1008 of the inner device 1000.

Charging status information is communicated between the charger controller 920 and the PMIC 908 via control line 916.

According to embodiments that provide for accelerated charging of the rechargeable power source 910 of the outer device 900 and/or the rechargeable power source 1008 of the inner device 1000, the charger controller 920 is also coupled to a voltage boost converter 922. The charger controller 920 is configured to determine whether or not to enable the voltage boost converter 922, which provides a higher voltage to the outer device 900 and/or inner device 1000 for charging. For example, the voltage boost converter 922 provides 5.0 V to the adjustable voltage regulator 940 when the voltage regulator 940 is enabled (via enable lines) for charging by the charger controller 920. If the outer and inner devices 900, 1000 are not in a connected configuration for charging, the voltage boost converter 922 is not enabled by the charger controller 920.

With further reference to FIG. 10, the inner device 1000 includes charging contacts 1002 configured to electrically connect with corresponding contacts coupled to the adjustable voltage regulator 940 of the outer device 900 via a wired charging link. In some embodiments, and as discussed previously, the inner device 1000 includes a receive coil for inductively receiving energy transmitted from a transmit coil of the outer device 900. The charging contacts 1002 are coupled to the PMIC 1004, which can include a temperature sensor (not shown). A suitable PMIC is the HPM10 Power Management IC available from ON Semiconductor. The PMIC 1004 is configured to cooperate with charging circuitry 901 of the outer device 900 to implement charging processes (e.g., standard and accelerated charging processes) and generate the voltage needed to charge the rechargeable power source 1008 (e.g., lithium-ion battery) when the outer device 900 is connected or coupled to the inner device 1000 via a wired or wireless charging link.

The PMIC 1004 of the inner device 1000 includes a charger communication interface configured to inform the PMIC 908 of the outer device 900 about the charging progress of the rechargeable power source 1008 of the inner device 1000. The charger communication interface of the PMIC 1004 can communicate charging-related information to the PMIC 908 of the outer device 900 via the charging contacts 1002 and/or via a communication facility 1014 coupled to a processor 1010 of the inner device 1000 in a manner previously described. Various types of charging-related information, such as voltage levels, current levels, temperature, and different types of power source failures, can be communicated to the PMIC 908 of the outer device 900.

The PMIC 1004 is coupled to processor 1010, which can be a DSP. The PMIC 1004 and processor 1010 communicate via power control lines 1011. For example, the PMIC 1004 can inform the processor 1010 about the charge state of the rechargeable power source 1008. The processor 1010 can be coupled to one or more other facilities of the inner device 1000. For example, the processor 1010 can be operatively coupled to an audio processing facility 1012, which can include any one or combination of one or more microphones, a speaker/receiver, analog front-end, DSP, and various analog and digital filters. The processor 1010 can be operatively coupled to a communication facility 1014, which can include one or both of an RF transceiver/antenna facility and an NFMI transceiver/antenna facility. The processor 1010 can be operatively coupled to a sensor facility 1016, which can include any one or a combination of one or more physiologic sensors 1018 and one or more positional sensors 1017.

In accordance with any of the embodiments disclosed herein, one or both of the outer device 900 and the inner device 1000 can be configured to implement accelerated charging of their respective rechargeable power sources 910, 1008 within a very short timeframe.

According to some embodiments, the charging unit 950 includes a rechargeable power source that can be recharged using accelerated charging in accordance with embodiments of the disclosure. The term "accelerated charging" refers to charging a rechargeable power source (e.g., a battery) at an accelerated charge rate above 1.0 C when the power source has a sufficiently low voltage or state of charge (SoC). Accelerated charging can be implemented to partially charge a rechargeable power source within a relatively short time frame, such that the power source has a storage capacity for several hours of use. Accelerated charging of a rechargeable power source can be implemented when the SoC of the power source is within a predetermined SoC range, such as between 5 and 45%. Because the power source is at a low voltage or low SoC, the rate at which it can be charged can be increased beyond 1.0 C without the risk of damaging the power source. For example, lithium plating can occur when charging a lithium-ion battery at charge rates above 1.0 C, particularly when the battery is almost fully charged. However, it is been found that charging a lithium-ion battery at an accelerated charge rate above 1.0 C (e.g., from 1.5 C to 3.0 C) when the SoC is within 5 to 45% significantly decreases the risk of cell degradation due to lithium plating.

The charging circuitry 901, 1001 of the outer and inner devices 900, 1000 can be configured to partially charge the rechargeable power sources 910, 1008 at an accelerated charge rate above 1.0 C (e.g., 1.5 C-3.0 C) when a state of charge (SoC) of the rechargeable power sources 910, 1008 is within a predetermined SoC range (or a predetermined voltage range, e.g., 3.0-4.1 V). For example, the predetermined SoC range is a range from a fully discharged state to about 45% (e.g., 5%-45%, such as 10%-35%). Charging at the accelerated charge rate can be terminated in response to one or more of reaching a predetermined time limit (e.g., 15 minutes), a predetermined voltage limit (e.g., 4.1V), or reaching a predetermined energy limit (e.g., 7.5 mAh out of a possible 17.5 mAh). When the SoC of the rechargeable power sources 910, 1008 is outside of the predetermined SoC range, the charging circuitry 901, 1001 is configured to charge the rechargeable power sources 910, 1008 at a normal charge rate at or below 1.0 C, such as at 0.3 C (e.g., when it is desired to fully charge the rechargeable power sources 910, 1008). It is noted that the charging current associated with the accelerated charge rate is typically greater than a charging current associated with the normal charge rate by a factor of about 3 to 10. For example, the charging current associated with the normal charge rate can be about 5 mA (e.g., at 0.3 C), whereas the charging current associated with the accelerated charge rate can be between 17 and 24 mA (e.g., at 1.5 C).

Figure 11:
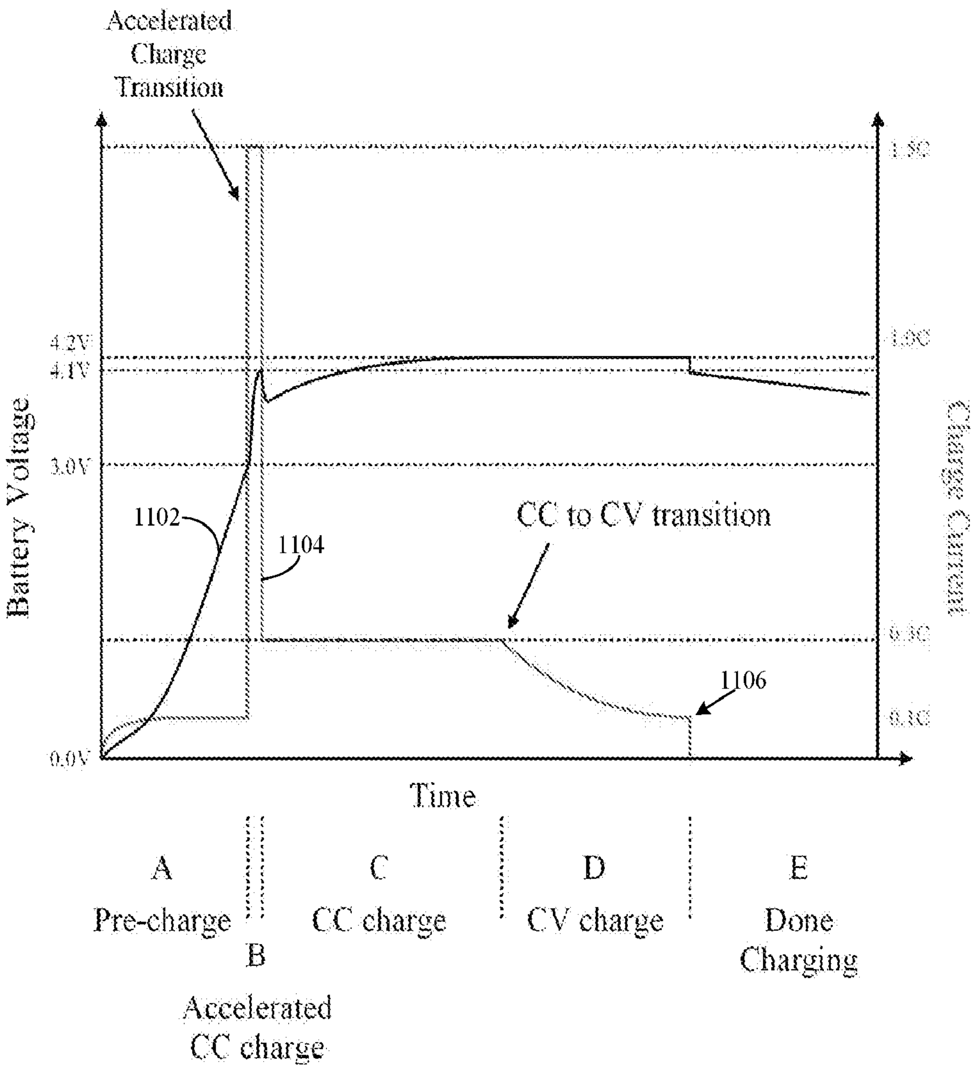
FIG. 11 is a graph that characterizes accelerated charging of a lithium-ion battery of the inner and/or outer device of an ear-worn electronic system in accordance with any of the embodiments disclosed herein.

FIG. 11 is a graph that characterizes accelerated charging of a lithium-ion battery in accordance with any of the embodiments disclosed herein. The graph of FIG. 11 characterizes battery voltage 1102 and charge current 1104 as a function of time during different phases of a charging procedure. As is indicated below the time axis, the different phases of the charging procedure include a pre-charge phase (A), an accelerated constant current charge phase (B), a constant voltage charge phase (D), and a charge complete phase (E). During the pre-charge phase (A), the charge current 1104 is low (e.g., 0.1 C) and the battery voltage 1102 slowly increases. It is noted that a well-designed system should stay out of this regime. The pre-charge phase (A) continues until the battery voltage 1102 reaches 3.0 V, at which time the accelerated constant current charge phase (B) is initiated.

During the accelerated charging phase (B), the charge current 1104 rapidly increases to a charge rate above 1.0 C, such as 1.5 C. During the accelerated charging phase (B), high current is supplied to the battery which results in a rapid increase in battery voltage 1102. For example, a charge current of 5 mA can be supplied to the battery during the latter part of the pre-charge phase (A) (e.g., at 0.3 C). The charge current can be increased to between 17 and 24 mA during the accelerated charging phase (B). The accelerated charging phase (B) continues until a predetermined time limit (e.g., 5-15 min) has been reached. In some embodiments, the accelerated charging phase (B) continues until a predetermined battery voltage 1102 (e.g., 4.1 V) or predetermined energy level (e.g., 7.5 mAh) has been reached.

At the conclusion of the accelerated charging phase (B), the charge current 1104 rapidly decreases to a normal charge current level (e.g., 5 mA at a charge rate of 0.3 C) at the initiation of the constant current charge phase (C). During the constant current charge phase (C), a normal charge current (e.g., 5 mA) is supplied to the battery resulting in a continued increase in the battery voltage 1102. When the battery voltage 1102 reaches a predetermined level (e.g., 4.2 V), the charging procedure transitions from the constant current charge phase (C) to the constant voltage charge phase (D). During the constant voltage charge phase (D), the charge current 1104 decreases until a cutoff 1106 is reached, at which time the charging procedure is terminated. It is noted that at the charging complete phase (E), the battery voltage 1102 slightly drops over time (e.g., from 4.1 V to 3.11 V).

In the embodiment shown in the FIG. 11, the charge current 1104 supplied during the accelerated charging phase (B) changes in a step-wise fashion. It is understood that, in some embodiments, the charge current 1104 can decrease gradually as the accelerated charging phase (B) transitions to the constant current charge phase (C).

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure.

Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-worn electronic system comprising a plurality of discrete devices configured for deployment at one ear of a wearer, the system comprising:

an inner device comprising:
- a first housing configured for placement at least partially within an ear canal of the wearer;
- a first rechargeable battery and first charging circuitry disposed in the first housing; and
- first electronic circuitry disposed in the first housing and coupled to the first rechargeable battery; and an outer device comprising:
- a second housing separate from the first housing and configured for placement at the wearer's ear proximal of the first housing in an outer ear direction; and
- a second rechargeable battery and second charging circuitry disposed in the second housing, the second charging circuitry configured to cooperate with the first charging circuitry to charge the first rechargeable battery via a charging link between the first and second charging circuitry;

wherein the inner device is configured to operate independently of the outer device when the outer device is removed from the wearer's ear.

2. The system of claim 1, wherein:

the inner device is configured for continuous use within the wearer's ear for a duration longer than a duration of inner device operation using a single charge of the first rechargeable battery; and the outer device is configured to charge the first rechargeable battery to support continuous use of the inner device within the wearer's ear for a duration longer than the duration of inner device operation using the single charge of the first rechargeable battery.

3. The system of claim 1, wherein:

the inner device is configured as a completely-in-the-canal (CIC) device; and the outer device is configured as a behind-the-ear (BTE) device or an in-the-ear (ITE) device.

4. The system of claim 1, wherein one or both of the inner device and the outer device is configured as a hearing device.

5. The system of claim 1, wherein the charging link comprises a wired charging link.

6. The system of claim 1, wherein the housing of the inner device comprises compliant material configured to enhance wearer comfort.

7. A method implemented using an ear-worn electronic system comprising an inner device and a separable outer device configured for deployment at one ear of a wearer, the method comprising:

receiving, by a connection port of the inner device, an electrical connector disposed at a distal end of a wired charging link extending from the outer device, the inner device comprising:

a first housing configured for placement at least partially within an ear canal of the wearer;

a first rechargeable battery and first charging circuitry disposed in the first housing; and first electronic circuitry disposed in the first housing and coupled to the first rechargeable battery; and the outer device comprising:

a second housing separate from the first housing and configured for placement at the wearer's ear proximal of the first housing in an outer ear direction; and a second rechargeable battery and second charging circuitry disposed in the second housing; and charging the first rechargeable battery using the second rechargeable battery via the charging link coupling the first charging circuitry and the second charging circuitry;

wherein the inner device operates independently of the outer device when the outer device is removed from the wearer's ear.

8. The method of claim 7, wherein:

the inner device is configured as a completely-in-the-canal (CIC) device; and the outer device is configured as a behind-the-ear (BTE) device or an in-the-ear (ITE) device.

9. The method of claim 7, wherein one or both of the inner device and the outer device is configured as a hearing device.

* * * * *